(12) United States Patent
Damnjanovic et al.

(10) Patent No.: US 9,143,946 B2
(45) Date of Patent: Sep. 22, 2015

(54) INTERFERENCE MANAGEMENT IN A MULTI-CARRIER COMMUNICATION SYSTEM

(75) Inventors: Jelena M. Damnjanovic, Del Mar, CA (US); Juan Montojo, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 12/559,414

(22) Filed: Sep. 14, 2009

(65) Prior Publication Data

US 2010/0075694 A1    Mar. 25, 2010

Related U.S. Application Data

(60) Provisional application No. 61/096,929, filed on Sep. 15, 2008, provisional application No. 61/172,160, filed on Apr. 23, 2009.

(51) Int. Cl.
*H04W 16/10* (2009.01)
*H04W 36/20* (2009.01)
(Continued)

(52) U.S. Cl.
CPC .............. *H04W 16/10* (2013.01); *H04W 36/20* (2013.01); *H04W 40/16* (2013.01); *H04W 48/20* (2013.01); *Y02B 60/50* (2013.01)

(58) Field of Classification Search
CPC .............. H04L 5/0051; H04L 5/0048–5/0057; H04W 52/367; H04W 16/10; H04W 16/12; H04W 16/16; H04W 16/32; H04W 72/0473
See application file for complete search history.

(56) References Cited

U.S. PATENT DOCUMENTS

| | | | | |
|---|---|---|---|---|
| 5,448,750 A | * | 9/1995 | Eriksson et al. | 455/452.2 |
| 5,940,743 A | * | 8/1999 | Sunay et al. | 455/69 |
| 6,212,386 B1 | | 4/2001 | Briere et al. | |

(Continued)

FOREIGN PATENT DOCUMENTS

| CN | 1513275 A | 7/2004 |
|---|---|---|
| CN | 1541023 A | 10/2004 |

(Continued)

OTHER PUBLICATIONS

Hierarchical architectures in the third-generation cellular network; Authors: Xiaoxin Wu, Biswanath Mukherjee and Dipak Ghosal Published Jun. 2004.*

(Continued)

*Primary Examiner* — Nalini Mummalaneni
(74) *Attorney, Agent, or Firm* — Dalei Dong

(57) ABSTRACT

Systems and methodologies are described that facilitate assigning carriers to access points based on power class. Devices can accordingly evaluate cells provided by the access points to select a cell with an optimal SNR or path loss for communication regardless of power class, since lower powered cells will not be interfered by higher powered cells communicating over different carriers. Cross-carrier operation is also provided where access points can transmit downlink signals according to carrier assignment information while receiving uplink signals over other carriers. Thus, once an optimal cell is determined, downlink control data can be received over the assigned carrier to ensure receipt without interference, but uplink transmissions can occur over multiple carriers to facilitate increased throughput using one or more reuse schemes.

38 Claims, 15 Drawing Sheets

(51) Int. Cl.
*H04W 40/16* (2009.01)
*H04W 48/20* (2009.01)

(56) References Cited

U.S. PATENT DOCUMENTS

| | | | |
|---|---|---|---|
| 6,289,007 B1 * | 9/2001 | Kim et al. | 370/331 |
| 6,529,491 B1 * | 3/2003 | Chang et al. | 370/335 |
| 2002/0145988 A1 | 10/2002 | Dahlman et al. | |
| 2004/0214579 A1 * | 10/2004 | Mattila | 455/449 |
| 2005/0128982 A1 | 6/2005 | Kitchin | |
| 2007/0297373 A1 | 12/2007 | Saifullah et al. | |
| 2008/0194267 A1 | 8/2008 | Ahn et al. | |
| 2008/0244148 A1 * | 10/2008 | Nix et al. | 710/313 |
| 2009/0221295 A1 * | 9/2009 | Sahin et al. | 455/450 |
| 2009/0291690 A1 * | 11/2009 | Guvenc et al. | 455/444 |

FOREIGN PATENT DOCUMENTS

| | | |
|---|---|---|
| EP | 0844798 | 5/1998 |
| EP | 1058473 | 12/2000 |
| JP | 1309526 A | 12/1989 |
| JP | H04287430 A | 10/1992 |
| JP | H05160781 A | 6/1993 |
| JP | H1075231 A | 3/1998 |
| JP | 10136443 A | 5/1998 |
| JP | 2001189687 A | 7/2001 |
| JP | 2001218245 A | 8/2001 |
| JP | 2002542707 A | 12/2002 |
| JP | 2004535143 A | 11/2004 |
| JP | 2007129405 A | 5/2007 |
| WO | WO0064059 | 10/2000 |
| WO | WO0232160 | 4/2002 |
| WO | WO03007636 | 1/2003 |
| WO | WO03007645 A1 | 1/2003 |
| WO | WO-2006105307 A1 | 10/2006 |
| WO | WO2007136339 | 11/2007 |
| WO | 2007139680 A2 | 12/2007 |
| WO | WO2008015562 | 2/2008 |
| WO | 2008093100 A2 | 8/2008 |

OTHER PUBLICATIONS

International Search Report & Written Opinion—PCT/US2009/057018—International Search Authority—European Patent Office, (Apr. 16, 2010).

Qualcomm Europe: "Cell Search and Association with Carriers" 3GPP Draft; R2-084403, 3rd Generation Partnership Project (3GPP), Mobile Competence Centre; 650, Route Des Lucioles; F-06921 Sophia-Antipolis Cedex; France, no. Jeju; 20080812, Aug. 12, 2008, XP050319472 [retrieved on Aug. 12, 2008] paragraph 3 paragraph 4 Figures 1 and 2.

Taiwan Search Report—TW098131160—TIPO—Oct. 17, 2012.

* cited by examiner

INTERFERENCE MANAGEMENT IN A MULTI-CARRIER COMMUNICATION SYSTEM

CROSS-REFERENCE

This application claims the benefit of U.S. Provisional Application Ser. No. 61/096,929, filed Sep. 15, 2008, and entitled "INTERFERENCE MANAGEMENT IN A MULTI-CARRIER COMMUNICATION SYSTEM," and U.S. Provisional Application Ser. No. 61/172,160, filed Apr. 23, 2009, and entitled "INTERFERENCE MANAGEMENT IN A MULTI-CARRIER COMMUNICATION SYSTEM," the entireties of which are incorporated herein by reference.

BACKGROUND

I. Field

The present disclosure relates generally to wireless communications and more specifically to managing interference in a multi-carrier communication system.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more access points (e.g., base stations, femtocells, picocells, relay nodes, and/or the like) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

In addition, wireless communication systems can support communication over multiple frequency carriers such that an access point can transmit to and receive from mobile devices over multiple carriers. Moreover, wireless communication networks can include a number of access points that provide wireless network access to mobile devices at different power levels. For example, wireless communication networks can include macrocell access points that provide a wide area of coverage by transmitting at high power, femtocell or picocell access points that provide a smaller coverage area by transmitting at lower power, and/or the like. In one example, the femtocell or picocell can provide tailored coverage to one or more mobile devices in close proximity and can be deployed in a service area covered by a macrocell access point. Because of power disparity and heterogeneous deployment, however, access points can interfere with one another when transmitting or receiving over similar resources.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating assigning different carriers to different cells in a wireless network. In one example, the carriers can be assigned according to power class of the access points providing the cells (e.g., macrocell, femtocell, picocell, etc.) to mitigate interference among access points with overlapping coverage areas. In addition, one or more carriers can be reserved for access points of given power classes to provide an optimal path loss cell selection to cells of the different power classes. In one example, carriers assigned according to power class can be enforced for downlink communications (and/or based on data type, such as control, general data, etc.), though uplink communications can occur over substantially any carrier. In this regard, interference is mitigated for data transmitted from access points of different power classes with overlapping coverage areas by using carriers appropriate for the power classes.

According to related aspects, a method is provided that includes determining a carrier assigned to access points of a power class. The method additionally includes receiving a transmission from an access point of the power class over the carrier.

Another aspect relates to a wireless communications apparatus. The wireless communications apparatus can include at least one processor configured to obtain carrier assignment information indicating association between detectable anchor carriers and access point power classes. The at least one processor is further configured to receive a signal over an anchor carrier from an access point of a power class, wherein the anchor carrier is associated with the power class according to the carrier assignment information. The wireless communications apparatus also comprises a memory coupled to the at least one processor.

Yet another aspect relates to an apparatus. The apparatus includes means for obtaining carrier assignment information that specifies association between carriers and access point power classes. The apparatus further includes means for receiving a signal over a detectable anchor carrier from an access point determined based at least in part on the carrier assignment information and a power class of the access point.

Still another aspect relates to a computer program product, which can have a computer-readable medium including code for causing at least one computer to determine a detectable anchor carrier assigned to access points of a power class. The computer-readable medium can also comprise code for causing the at least one computer to receive a transmission from an access point of the power class over the carrier.

Moreover, an additional aspect relates to an apparatus including a carrier information receiving component that obtains carrier assignment information that specifies association between carriers and access point power classes. The apparatus can further include a carrier communication component that receives a signal over a detectable anchor carrier from an access point determined based at least in part on the carrier assignment information and a power class of the access point.

According to further aspects, a method is provided that includes receiving carrier assignment information that specifies carriers for access points of disparate power classes. The method also includes selecting a carrier for transmitting signals in a wireless network based at least in part on the carrier assignment information and a power class and transmitting a signal to one or more devices over the carrier.

Another aspect relates to a wireless communications apparatus. The wireless communications apparatus can include at least one processor configured to receive carrier assignment information indicating association between carriers and access point power classes and select a carrier for communicating in a wireless network based at least in part on the carrier assignment information. The at least one processor is further configured to transmit a signal over the carrier to one or more wireless devices. The wireless communications apparatus also comprises a memory coupled to the at least one processor.

Yet another aspect relates to an apparatus. The apparatus includes means for receiving carrier assignment information that associates carriers with access point power classes. The apparatus further includes means for selecting a carrier for transmitting based at least in part on the carrier assignment information and a power class and means for transmitting a signal to one or more devices over the carrier.

Still another aspect relates to a computer program product, which can have a computer-readable medium including code for causing at least one computer to receive carrier assignment information that specifies carriers for access points of disparate power classes. The computer-readable medium can also comprise code for causing the at least one computer to select a carrier for transmitting signals in a wireless network based at least in part on the carrier assignment information and a power class and code for causing the at least one computer to transmit a signal to one or more devices over the carrier.

Moreover, an additional aspect relates to an apparatus including a carrier configuration component that receives carrier assignment information that associates carriers with access point power classes. The apparatus can further include a carrier selecting component that chooses a carrier for transmitting based at least in part on the carrier assignment information and a power class and a carrier communication component that transmits a signal to one or more devices over the carrier.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed, and the described embodiments are intended to include all such aspects and their equivalents.

DETAILED DESCRIPTION

Figure 1:
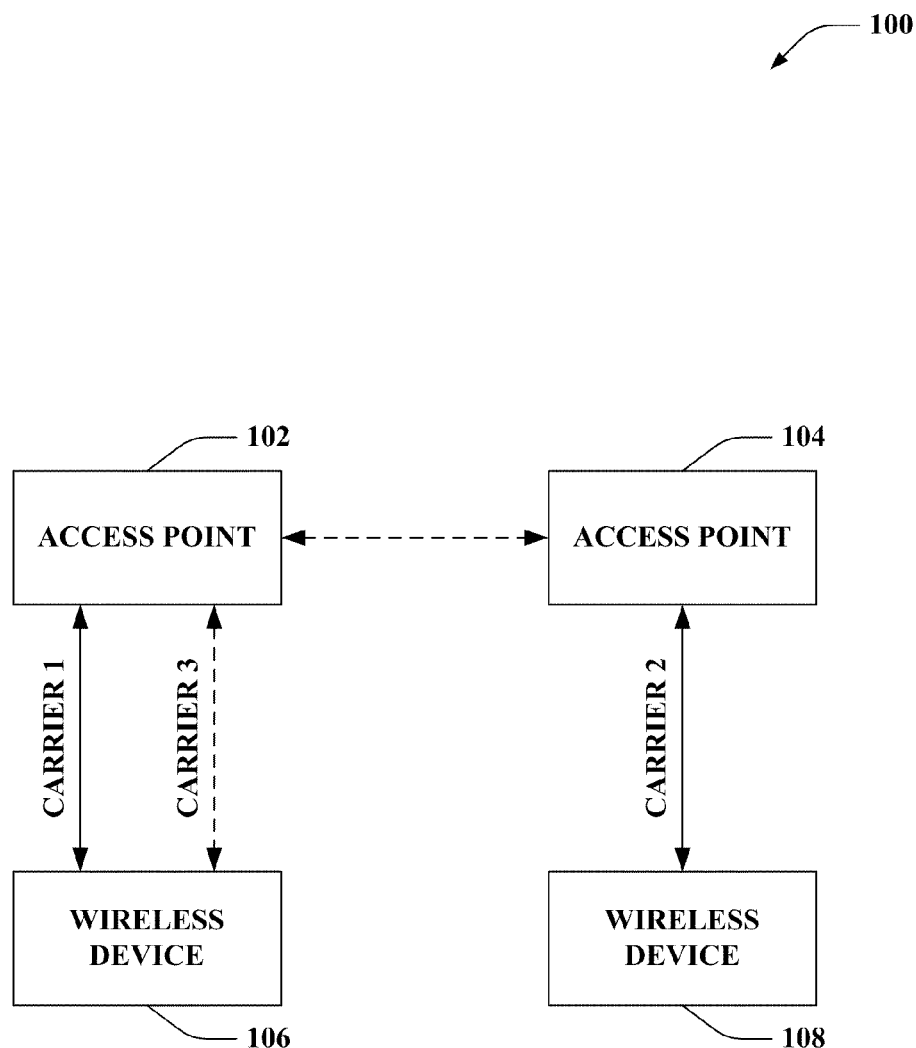
FIG. 1 is a block diagram of a system for assigning carriers to access points according to power class.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates an example wireless network 100 that facilitates assigning carriers to access points according to power class. Access points 102 and 104 are provided that communicate with wireless devices 106 and 108, respectively. Access points 102 and 104 can be of different power classes. For example, access point 102 can be a macrocell access point that provides wireless network access to a plurality of wireless devices (e.g., wireless device 106) over a large coverage area, and access point 104 can be a femtocell access point that provides specific wireless network access to one or more wireless devices (e.g., wireless device 108) in a smaller coverage area. Moreover, the coverage areas provided by the access points 102 and 104 can overlap, which can typically result in interference over similar communication resources. Wireless devices 106 and 108 can be substantially any sort of device that can communicate in a wireless network, such as a mobile device, access point, relay node, etc.

According to an example, access points 102 and 104 can be assigned different carriers for communicating with wireless devices in an area. In one example, as mentioned, the access point 102 can be a macrocell access point and can define carrier assignments for access points in one or more of its cells. In this example, access point 102 can communicate carrier assignment information to access point 104, such as one or more carriers useable by the access point 104 (e.g., based on its power class), which can include designation of an anchor carrier, for example. An anchor carrier can refer to a carrier reserved explicitly for communications from access points of a power class in the area. In another example, the area can relate to the entire wireless network such that per power class carrier assignment, anchor carrier specification, etc. is similar among all cells. The access points 102 and 104, in this example, can acquire carrier assignment information from a core network. It is to be appreciated that substantially any area can be defined for assigning power class specific carriers, as described herein.

In one example, the access points 102 and 104 can provide pilot signals or system acquisition information over the assigned carriers. In this regard, wireless devices 106 and 108 can search for and select appropriate access points based on the best path loss, cell loading, backhaul loading, etc. (and/or optimal signal-to-noise ratio (SNR) regardless of the access point power class. In addition, carrier designations of each access point can be communicated to the wireless devices 106 and 108 in system information. It is to be appreciated, in one example, that the wireless devices 106 and 108 can be associated with appropriate access points 102 or 104 based on direction by a wireless network (not shown) to select a cell with a certain anchor carrier and/or power class to receive control and/or data.

As shown, access point 102 communicates with wireless device 106 over carrier 1 while access point 104 communicates with wireless device 108 over carrier 2. This can be for downlink and/or uplink, control and/or general data, communications. Thus, even where the access points 102 and 104 overlap in coverage area, certain communications with the access points will not interfere where they are over disparate carriers. In addition, other carriers may be available, such as carrier 3, and accordingly assigned to one or more access point power classes. In this example, however, each defined power class has an anchor carrier that is guaranteed to that power class and detectable by wireless devices 106 and 108 communicating with related access points 102 and 104. An anchor carrier assigned to a given power class of access points can enable synchronization with a wireless device, access, idle state camping, reliable control coverage, etc. In the depicted example, carrier 1 can be designated to access point 102 power classes as an anchor carrier and carrier 2 to access point 104 power classes. Carrier 3, however, can be assigned to one or more access point 102 power classes as an additional carrier for communications.

According to another example, access points of similar power classes can also interfere with one another (e.g., due to heterogeneous deployment). Providing additional carriers to the access point power class allows potentially interfering access points to utilize the additional carriers to mitigate interference. In addition, the access points can implement frequency reuse schemes to mitigate interference. It is to be appreciated, however, that such interference mitigation among access points of similar power classes may not be necessary, as the functionalities described herein facilitate optimal path loss selection regardless of access point power class.

Moreover, for example, access points 102 and 104 can utilize the carrier assignment for downlink communications while using substantially all available carriers for uplink communications. The carrier utilization information can be defined according to a wireless network specification, received configuration, by the access point 102 for other access points within its cell, and/or the like. In this regard, access points 102 and 104 and wireless devices 106 and 108 can use cross-carrier operation where, for instance, downlink carriers may not necessarily match up with uplink carriers. Thus, for example, access point 102 can transmit downlink control data, such as grants and hybrid automatic repeat/request (HARM) feedback, to wireless device 106 over carrier 1, but receive uplink control data from the wireless device 106 over carriers 1, 2, and/or 3. Using the anchor carrier to transmit control data in this regard provides a single reliable carrier for transmitting the control data for a given power class of access point that will not be interfered with other power classed access points. As described, interference may not need to be mitigated for uplink data as carrier assignment allows wireless devices (e.g., wireless devices 106 and 108) to select access points with optimal path loss such that communications therewith will likely not be interfered by higher SNR signals.

In yet another example, rather than using explicit carrier assignments, access points 102 and 104 can associate certain carriers with transmit powers. For instance, where access point 104 and wireless device 108 are located near the edge of the access point 102 coverage area, they can communicate using the anchor carrier, carrier 1, of access point 102 with low power, so as not to interfere with access point 102 communications. This can mitigate interference from cells of another coverage area having disparate carrier configuration, as described further herein. Similarly, access point 102 can utilize carrier 2 for communication with a device close in proximity using low power, so as not to interfere with access point 104. This can be done for performance reasons, such as where carriers 1 and 3 are highly utilized by the access point 102, and/or similar scenarios. Moreover, though not shown, it is to be appreciated that wireless device 106 can additionally communicate with access point 104 (and/or wireless device 108 with access point 102) in such multi-carrier configurations.

Figure 2:
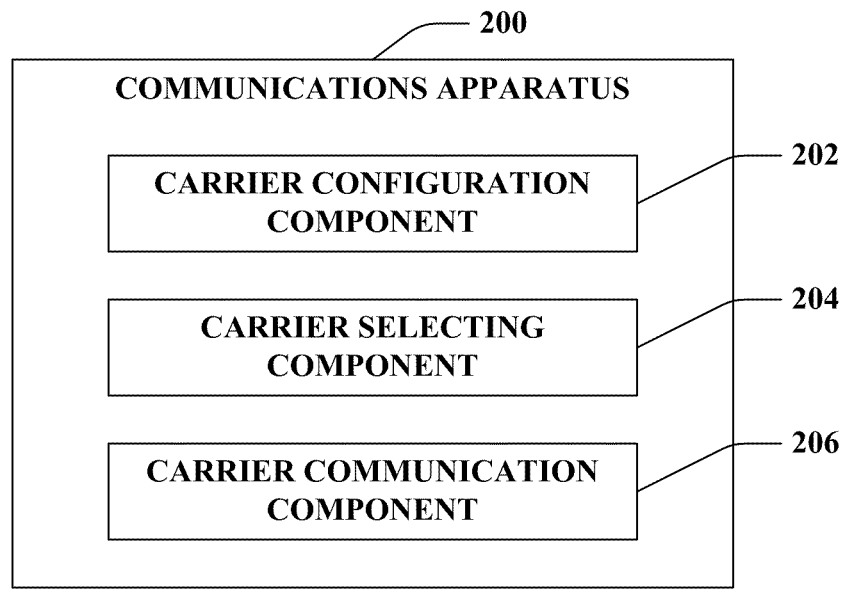
FIG. 2 is an illustration of an example communications apparatus for employment within a wireless communications environment.

Referring next to FIG. 2, a communications apparatus 200 that can participate in a wireless communications network is illustrated. The communications apparatus 200 can be an access point, a portion thereof, or substantially any device that can provide access to a wireless network, such as a mobile device in a peer-to-peer configuration, mobile base station, relay node, and/or the like. The communications apparatus 200 can include a carrier configuration component 202 that receives information regarding carrier assignment, a carrier selecting component 204 that chooses a carrier based on carrier assignment information, and a carrier communication component 206 that transmits data to, and/or receives data from, one or more wireless devices using a selected carrier.

According to an example, the carrier configuration component 202 can obtain carrier assignment information from a specification, configuration, disparate network component (not shown), macrocell access point providing a cell (not shown), and/or the like. The carrier assignment information can specify one or more carriers that can be utilized by access points of different power classes, such as an anchor carrier and/or one or more additional carriers. Carrier selecting component 204 can determine one or more carriers over which to communicate based on the carrier assignment information. For example, where communications apparatus 200 is of a power class specified in the information, the carrier selecting component 204 can select the corresponding carrier. The carrier communication component 206 can transmit to and/or receive from one or more devices (not shown) over the selected carrier.

As described, carrier selecting component 204 can choose the indicated anchor carrier for power class of the communications apparatus 200, and the carrier communication component 206 can transmit pilot signals or other system acquisition information over the anchor carrier. This mitigates interference for such communications from other access points, which can allow devices to select an access point with an optimal path loss regardless of a power class of the access point. In addition, as described, carrier selecting component 204 can select carriers for power class of the communications apparatus 200 that the carrier communication component 206 can utilize with downlink communications and select additional available carriers for carrier communication component 206 to receive uplink communications. In this regard, carrier communication component 206 facilitates cross-carrier communication with various devices.

Figure 3:
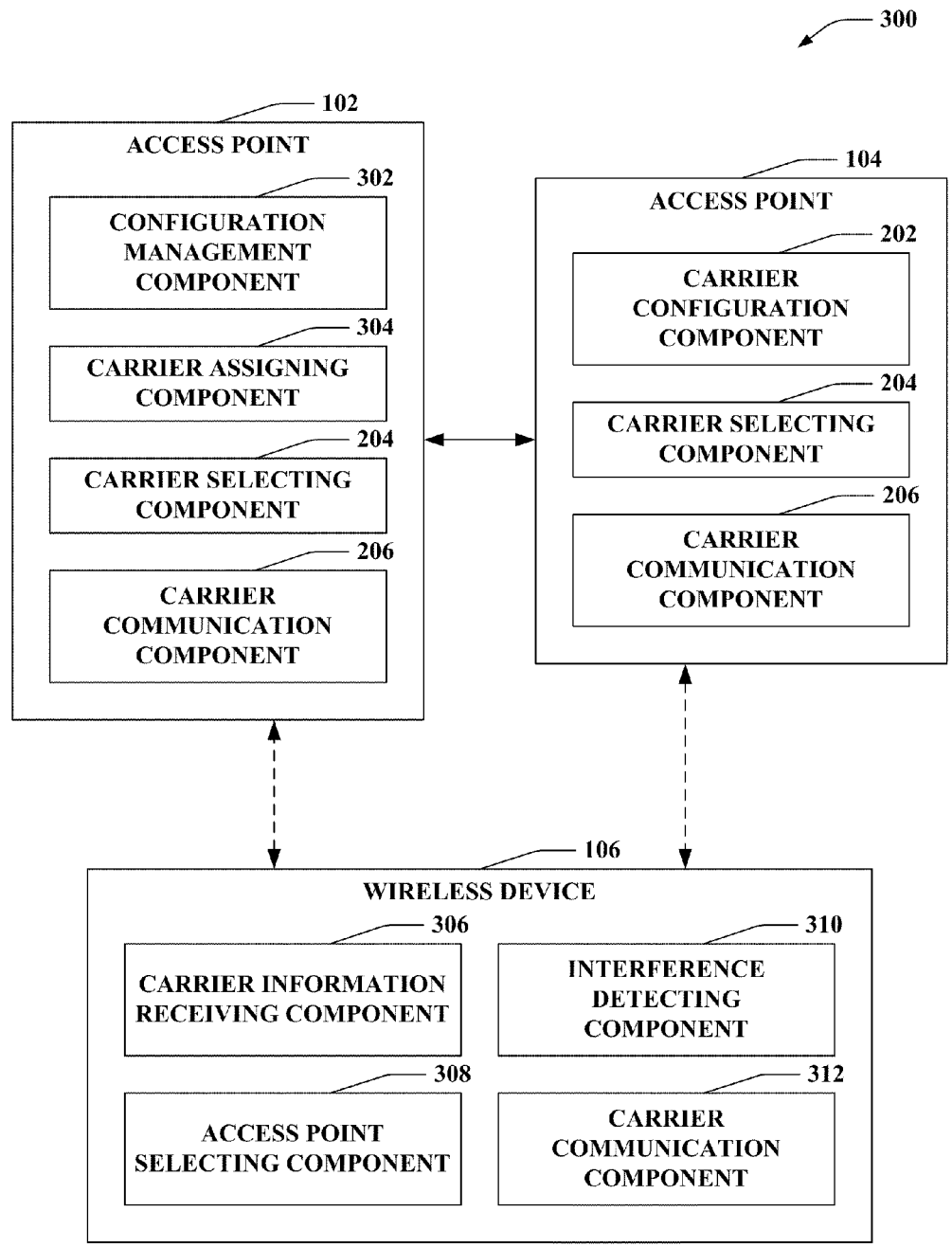
FIG. 3 illustrates an example wireless communication network that effectuates communicating over carriers assigned according to access point power class.

Now referring to FIG. 3, illustrated is a wireless communications system 300 that facilitates assigning communication carriers to access points according to power class. Access points 102 and 104, as described, can be substantially any type of base station or mobile device (including not only independently powered devices, but also modems, for example) that provides wireless network access, and/or portion thereof. In addition, wireless device 106 can be a mobile device or other device that receives wireless network access. Moreover, system 300 can be a MIMO system and/or can conform to one or more wireless network system specifications (e.g., EV-DO, 3GPP, 3GPP2, 3GPP LTE, WiMAX, etc.). Also, the components and functionalities shown and described below in the access point 102 can be present in access point 104.

Access point 102 can include a configuration management component 302 that maintains carrier assignment information for a cell provided by access point 102, a carrier assigning component 304 that associates carriers with access point power classes based at least in part on the carrier assignment information, a carrier selecting component 204 that chooses a carrier to communicate with one or more wireless devices based on power class of the access point 102 and the carrier assignment information, and a carrier communication component 206 that communicates with devices over the selected carrier. Access point 104 includes a carrier configuration component 202 that can receive carrier assignment information from a network component or disparate access point, a carrier selecting component 204 that can choose a carrier for communicating with one or more devices based on the carrier assignment information, and a carrier communication component 206 that can transmit to and receive from devices over selected carriers.

Wireless device 106 can include a carrier information receiving component 306 that obtains carriers utilized by access points for communicating in a wireless network, an access point selecting component 308 that determines an access point with which to communicate based on evaluating communication over the carriers, an interference detecting component 310 that can determine interference over a carrier assigned by an access point and report the interference to the access point, and a carrier communication component 312 that can communicate with an access point over one or more provided carriers.

According to an example, access point 102 can be a macrocell access point that defines carrier configuration for its cell coverage area. In this example, configuration management component 302 can maintain a configuration that specifies carrier assignment information for access points according to power class. For example, the carrier assignment information, as described, can include anchor carriers and/or additional carriers reserved for access points of varying power classes so that wireless device 106 can detect the access points via signals transmitted over the anchor carrier. The configuration management component 302 can maintain the configuration based on network specification, hardcoding, provisioning from a wireless network, and/or the like, for instance. Carrier assigning component 304 can provide the carrier assignment information to access points within its cell coverage area, such as access point 104. The carrier assigning component 304, in one example, can transmit the configuration to the access point 104 over a backhaul link, over the air, via one or more network components, using a mobile device, and/or the like.

Carrier configuration component 202 can receive the carrier assignment information from access point 102, or another network component, and carrier selecting component 204 can choose a carrier based on power class of the access point 104 and the carrier assignment information, as described. The carrier communication component 206 of access point 104 can communicate with one or more devices over the carrier. As described, the carrier selecting component 204 can choose from substantially all carriers for receiving uplink communications while using the carrier selected from the carrier assignment information for transmitting downlink communications. Carrier selecting component 204 of access point 102 can similarly select a carrier over which carrier communication component 206 of the access point 102 can transmit to and receive from one or more devices according to the carrier assignment information and power class of the access point 102.

In another example, the carrier assignment information can include available carriers with an indication of power level that can be utilized to communicate over the carriers. In this example, carrier assigning component 304 can provide the carrier assignment information to access points 102 and 104 (and/or other access points in the coverage area of the cell provided by access point 102). The carrier selecting component 204 can choose an available carrier and transmit at the transmit power indicated in the carrier assignment information according to power class. Thus, for example, the information can provide that access points with the power class of access point 104 can transmit full power over carrier 2 while access points of the power class of access point 102 can transmit over carrier 2 using only a small amount of power, so as not to significantly interfere with access points in the power class of access point 104. In one example, based on the information, access point 102 can transmit over carrier 2 at a power specified for access point 104. Thus, where access point 104 is a femtocell and can transmit at full power according to the information, access point 102 can transmit at the full femtocell power over the carrier as well, in this example.

In this regard, for example, carriers can be categorized in the information generated or received by the configuration management component 302 to include open access shared carriers with unrestricted power, which can be anchor carriers for macrocells, open access shared carriers with low power, which can be anchor carriers for femtocells or picocells, closed access carriers with low power, which can be anchor carriers for closed subscriber group cells, and/or the like. As described, carrier selecting components 204 can communicate using carriers that apply to their respective access points 102 and 104 types and/or carriers of other access point types so long as carrier communication components 206 comply with the relevant power restrictions. Allowing access points 102 and 104 of different power classes to use different carriers assigned according to power class can extend range of the access point 104 by mitigating interference from higher power classed access point 102. It is to be appreciated that enforcing power constraints for higher power classed access point 102 communicating over lower power classed carriers, as described above, additionally facilitates such range extending for lower power classed access point 104. This, in turn, also allows the access point selecting component 308 to select a cell (or related access point) based on path loss, cell loading backhaul loading, etc., rather than merely choosing a cell with highest SNR from a selection of cells including all power classes, as described further herein.

Moreover, in an example, additional carriers can be assigned to access points of a power class. This can be defined in the carrier assignment information, for instance. In another example, the access point 104 can request an additional carrier for its power class (e.g., based on high activity and/or low resource availability). The carrier assigning component 304 can allocate an additional carrier to the access point 104, which the carrier selecting component 204 of access point 104 can utilize for choosing a carrier for transmitting downlink control data via carrier communication component 206. In another example, an additional carrier can be requested based on conflicting carrier assignment in a neighboring cell (e.g., where the assignment results in interference to access point 104 from a macrocell access point).

Wireless device 106 can travel over the wireless network and search for an access point from which to receive access to the wireless network. Carrier information receiving component 306 can obtain carriers over which access points, such as access points 102 and 104, transmit pilot signals or other system access information. In an example, carrier information receiving component 306 can receive carrier assignment information including carriers over which certain power classed access points communicate. As described, this can include anchor carrier assignments for the disparate power classed access points. The carrier assignment information can be transmitted to the wireless device 106 by access points 102 and/or 104, and can relate to a future configuration. In this example, the future configuration can become valid at a certain point in time to allow a transition period where configuration is modified. In one example, access point selecting component 308 can choose one or more access point with the best path loss, cell loading, backhaul loading, etc. (or SNR) over the carriers for further communications. As described, with access points of different power classes transmitting system access signals over disparate carriers, access point selecting component 308 can choose an access point with the best path loss or SNR. Once selected, the access point can communicate, at least over the downlink, using one or more carriers assigned for its power class, as described.

Interference detecting component 310 can determine whether communications with the access point over the carrier is interfered by a disparate access point in a different neighboring cell. This can occur, for example, where the cells have different carrier assignment schemes. For example, carrier 2 in the cell provided by access point 102 can be reserved for low power access points, but be reserved for macrocell access points in a neighboring cell. Where, for instance, wireless device 106 is communicating with access point 104 near the outer perimeter of the cell provided by access point 102, communication can be interfered over carrier 2. In this case, interference detecting component 310 can discern the interference and provide an indication of interference to the access point 104. The carrier configuration component 202 can request an additional carrier, if it has not already been allocated one, and the carrier selecting component 204 of access point 104 can select an additional carrier for communicating with the wireless device 106. Carrier communication component 312 can communicate with the access point 104 over the additional carrier, in this example.

In another example, carrier selecting component 204 of the access point 104 can select a carrier for communicating with wireless device 106 that is allocated for macrocell access points, such as access point 102, where it will not interfere with access point 102 (e.g., where access point 104 is a low power access point and wireless device 106 is located in close proximity). In addition, as described, the carrier communication component 206 can adjust transmit power even lower, in this example, to avoid interfering with access point 102.

Moreover, carrier selecting components 204 of access points 102 and 104 can select carriers for communicating with the wireless device 106 according to carrier assignment information for their given power classes for downlink communications only, allowing substantially all available carriers to be utilized for uplink communication. In addition, as described, it is to be appreciated that wireless device 106 can communicate with both access point 102 and access point 104 in the cell for increased throughput. In one example, wireless device 106 can communicate over downlink with access point 102 while communicating uplink data to access point 104.

Figure 4:
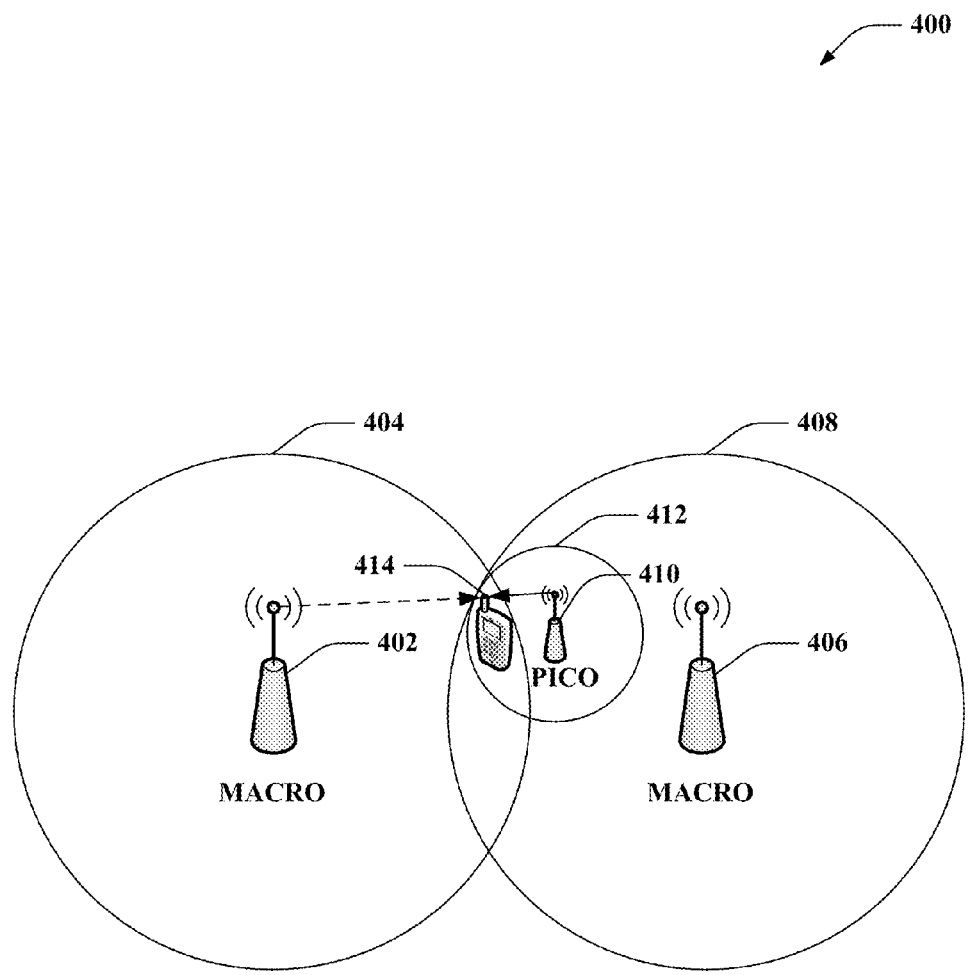
FIG. 4 illustrates an example wireless communication system that assigns carriers to access points in a cell according to power class.

Referring to FIG. 4, an example wireless communications system 400 is illustrated that facilitates designating carriers for access point communication according to power class. System 400 includes a macrocell access point 402 that provides coverage area 404 for receiving and transmitting communications from/to the access point 402, as well as macrocell access point 406, implementing coverage area 408 that intersects coverage area 404. In addition, a picocell access point 410 can reside in coverage area 408 and can provide a smaller coverage area 412 using lower transmitting power, as described. In addition, picocell access point 410 can communicate with a mobile device 414 present in its coverage area 412, which overlaps with coverage area 408 as well.

As described, macrocell access point 406 can define a carrier assignment scheme for its coverage area 408—this can be received from one or more network components, in one example. For instance, macrocell access point 406 can allocate carrier 1 for macrocell communications and carriers 2 and 3 for picocell communication. Thus, picocell access point 410 can receive the carrier assignment information, as described, and communicate with mobile device 414 over carriers 2 and/or 3. Macrocell access point 402, however, can define a disparate carrier assignment scheme for its coverage area 404. For instance, macrocell access point 402 can reserve carriers 1 and 3 for macrocell communication and carrier 2 for picocell communication. Thus, where picocell access point 410 communicates with the mobile device 414 over carrier 3, it can be interfered by macrocell access point 402 communicating over carrier 3, as shown. In this example, additional interference management can be performed.

According to one example, the mobile device 414 can report the interference from macrocell access point 402 to the picocell access point 410, and the picocell access point 410 can schedule communications over carrier 2 instead, as described previously. Further, in this example, a mobile device, such as mobile device 414, can report interference level to a potential access point, such as picocell access point 410, for substantially all available carriers (or at least carriers for the power class of the potential access point), and the potential access point can schedule communication over the carrier with the least amount of reported interference. In another example, time and/or frequency reuse can be utilized by the picocell access point 410 and/or macrocell access point 402 to mitigate interference. In yet another example, the macrocell access point 402 can dynamically or semi-statically adjust transmission power over the carrier (e.g., for certain time resources) so as not to interfere with picocell access point 410 to mobile device 414 communications.

Figure 5:
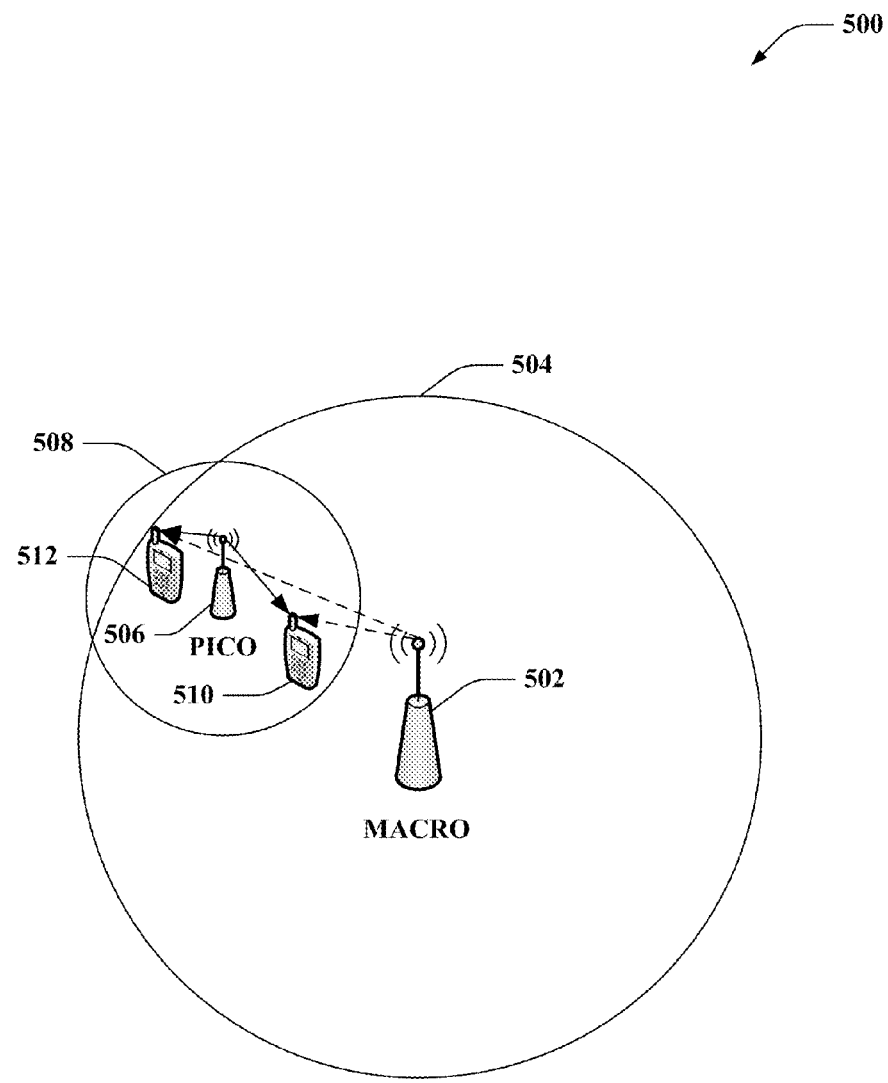
FIG. 5 illustrates an example wireless communication system that facilitates transmitting to a device over a carrier assigned to a disparate power class.

Turning to FIG. 5, illustrated is an example wireless communications system 500 that facilitates communicating among network devices using assigned carriers to mitigate interference. System 500 includes a macrocell access point 502 that provides wireless network access in coverage area 504 and a picocell access point 506 that provides wireless network access in coverage area 508, which is partially within coverage area 504. In this regard, picocell access point 506 can receive carrier assignment information associated with coverage area 504 and/or a portion of a related wireless network. In one example, the carrier assignment information can be defined by the macrocell access point 502, the wireless network, the picocell access point 506, one or more network components, and/or the like, as described previously. For instance, the carrier assignment information can specify that carriers 1 and 3 are allocated for macrocell communication and carrier 2 is allocated for picocell communication.

In this example, picocell access point 506 can communicate with mobile devices 510 and 512 to provide wireless network access thereto. Picocell access point 506 can communicate with mobile device 510 over carrier 2; mobile device 510 can receive interference over carriers 1 and 3. Picocell access point 506 in one example, however, can communicate with mobile device 512 over carrier 1 or 3 since mobile device 512 is close enough to picocell access point 506 and far enough away from macrocell access point 502 that it will likely not experience much interference over carriers 1 and 3. Further, picocell access point 506 communicating in close range over carriers 1 and 3 will likely not interfere with macrocell access point 502 communications. This allows for efficient resource utilization by the picocell access point 506 as it can save carrier 2 resources for mobile device 510 and/or other devices that will likely be interfered by macrocell access point 502 communications.

In this example, mobile device 512 can report SNR related to the picocell access point 506 and macrocell access point 502 over the carriers, as described, and where the SNRs are similar, picocell access point 506 can communicate over the carriers reserved for macrocell communication. Picocell access point 506, in this example, can use dedicated radio resource control (RRC) signaling to inform mobile device 512 to monitor downlink carriers 1 and 3. It is to be appreciated that picocell access point 506 can communicate with mobile device 512 over all 3 carriers in this regard to provide increased throughput.

Figure 6:
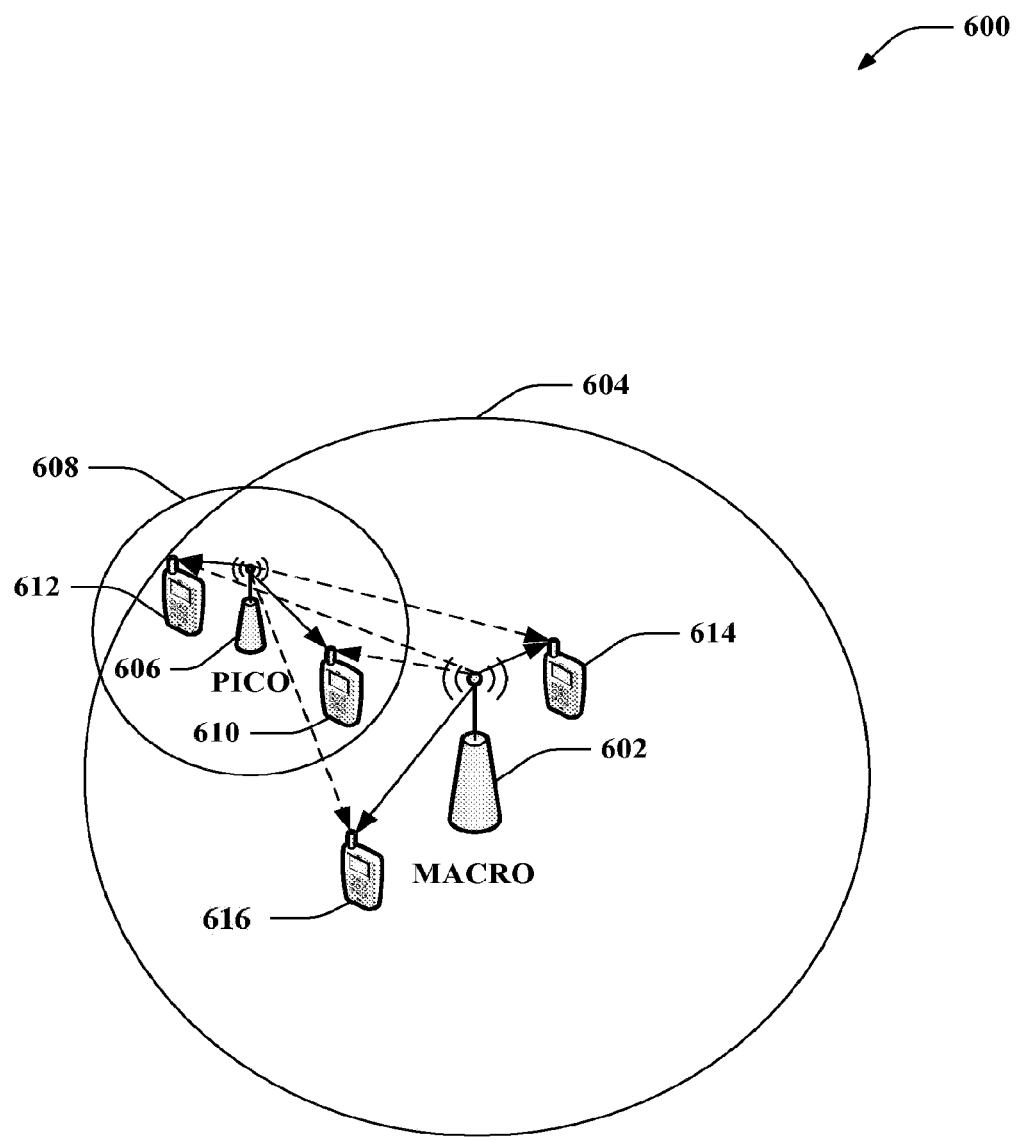
FIG. 6 illustrates an example wireless communication system that facilitates communicating with devices over carriers assigned to disparate power classes without introducing interference.

Referring to FIG. 6, illustrated is an example wireless communications system 600 that facilitates communicating among network devices using assigned carriers and power control to mitigate interference. System 600 includes a macrocell access point 602 that provides wireless network access in coverage area 604 and a picocell access point 606 that provides wireless network access in coverage area 608, which is partially within coverage area 604. In this regard, picocell access point 606 can receive carrier assignment information associated with coverage area 604 and/or a portion of a related wireless network. In one example, the carrier assignment information can be defined by the macrocell access point 602, the wireless network, the picocell access point 606, one or more network components, and/or the like, as described previously. The carrier assignment information can also include power control information. For instance, the carrier assignment information can specify that carriers 1 and 3 are allocated for high power macrocell communication and/or low power picocell communication and carrier 2 is allocated for high power picocell communication and/or reduced power macrocell communication.

In this example, macrocell access point 602 can communicate with mobile devices 614 and 616 to provide wireless network access thereto, and picocell access point 606 can communicate with mobile devices 610 and 612 to provide wireless network access thereto. Macrocell access point 602 can communicate with mobile device 616 over carriers 1 and/or 3 using full or high power. As mobile device 614 is further from picocell access point 606 and close to macrocell access point 602, macro cell access point 602 can communicate with mobile device 614 over carrier 2 using lower power to transmit, so as not to interfere with picocell access point 606 communications. Mobile device 614 can experience low interference over carrier 2 from picocell access point 606 and can report this to the macrocell access point 602. The macrocell access point 602 can determine whether to communicate over carrier 2 and/or what power to use (without exceeding a maximum power that can be specified in the carrier assignment information) according to the level of interference.

Similarly, picocell access point 606 can communicate with mobile device 610 over carrier 2 using full power. Mobile device 610 can receive interference over carriers 1 and 3. Picocell access point 606 in one example, however, can communicate with mobile device 612 over carrier 1 or 3 since mobile device 612 is close enough to picocell access point 606 and far enough away from macrocell access point 602 that it will likely not experience much interference over carriers 1 and 3. In an example, picocell access point 606 can communicate over carriers 1 and 3 using lower power so as not to interfere with macrocell access point 602 communications. Similarly as described above, picocell access point 606 can determine whether to communicate over carriers 1 and 3 (and/or a power level to use in communicating over the carriers) based on interference information reported by mobile device 612 for the carriers.

Figure 7:
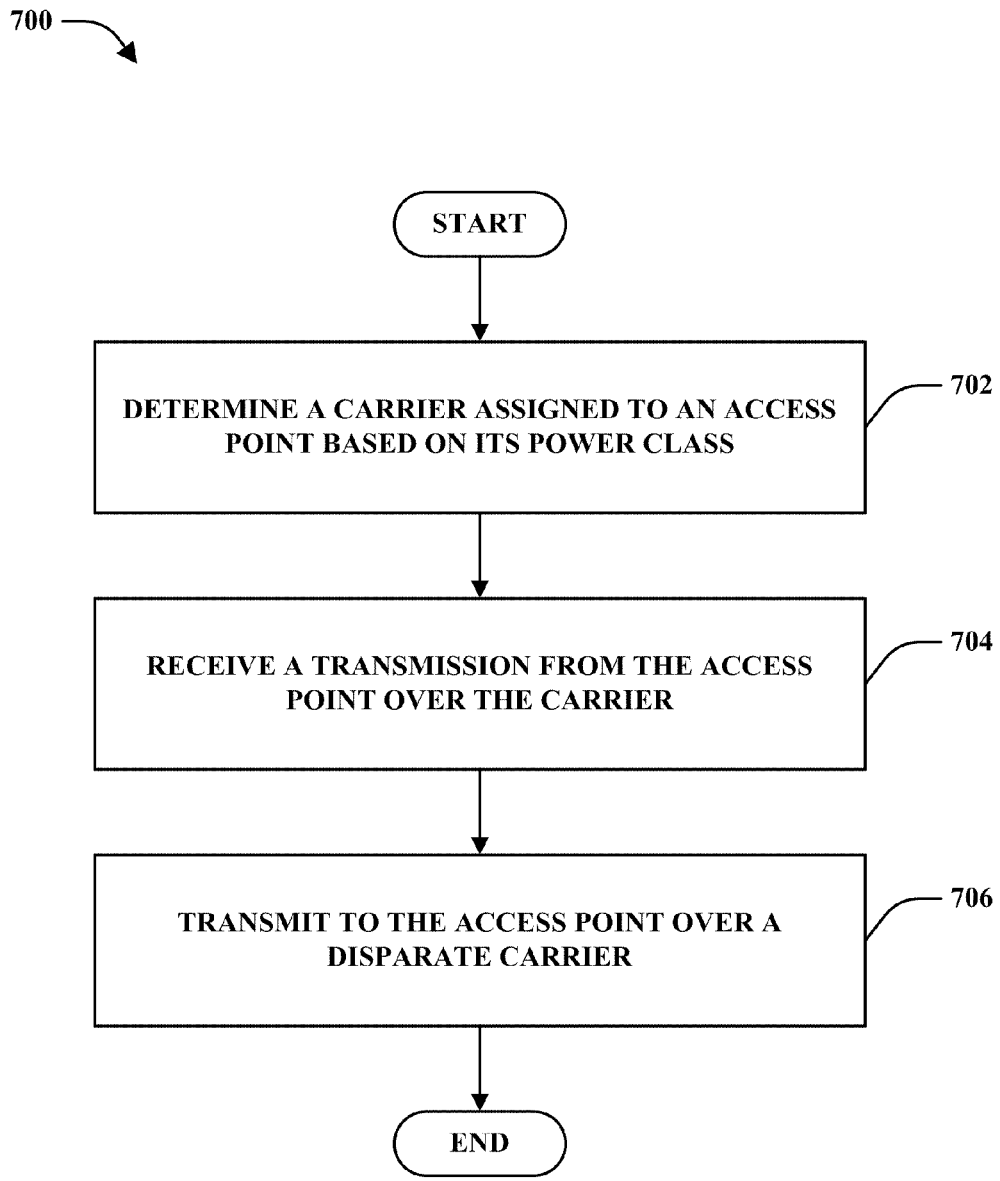
FIG. 7 is a flow diagram of an example methodology that receives communications over carriers assigned to access points based on power class.
Figure 8:
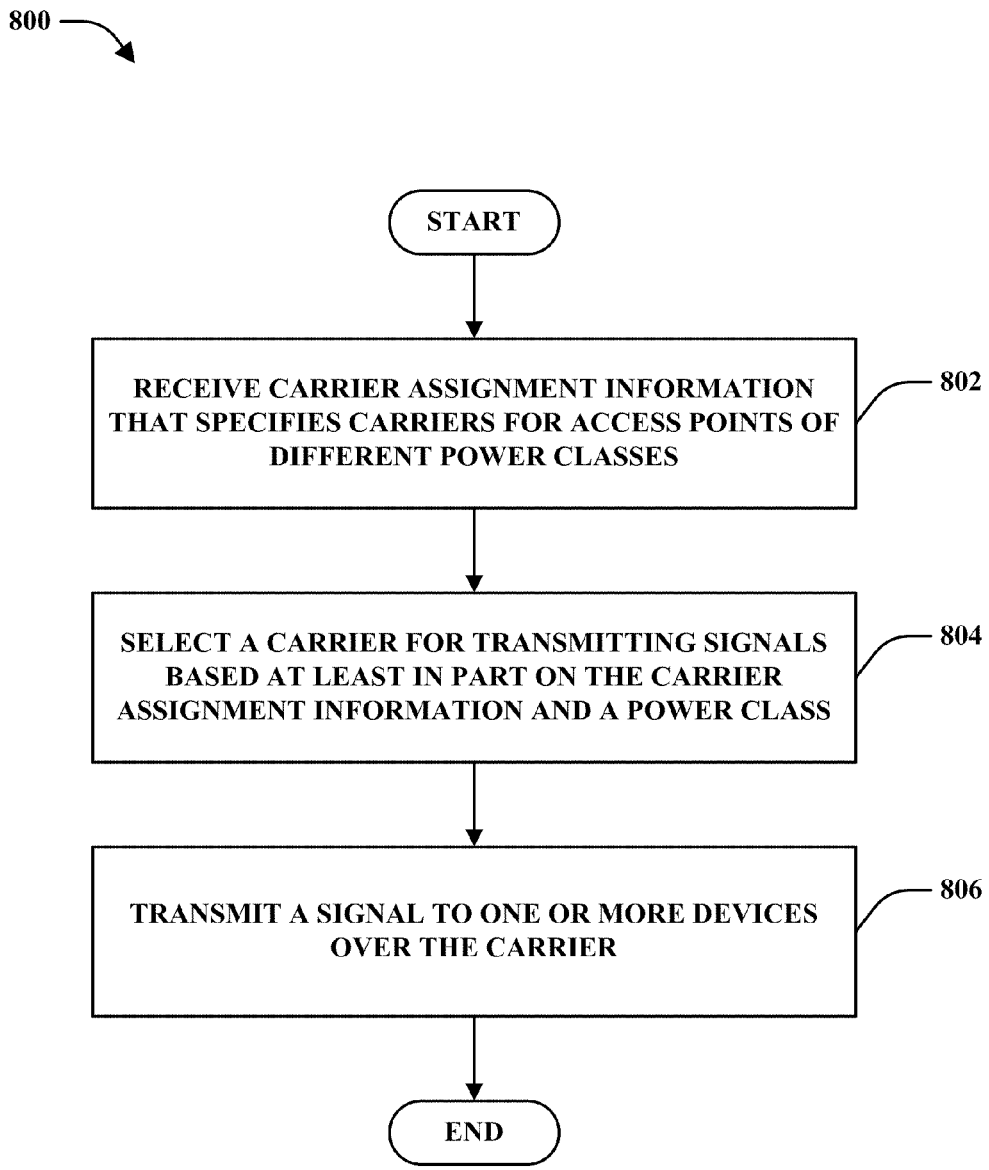
FIG. 8 is a flow diagram of an example methodology that utilizes carriers in a wireless communication network according to power class.

Referring now to FIGS. 7-8, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 7, illustrated is a methodology 700 for receiving transmissions from access points over different carriers based on power class. At 702, a carrier assigned to an access point can be determined based on a power class of the access point. This can be determined according to carrier assignment information, for example, that can be received from one or more access points in a cell. At 704, a transmission can be received from the access point over the carrier. In one example, a path loss can be determined from the transmission, and the access point can be selected for communication based on the path loss regardless of power class, as described, since it is not interfered from access points of other power classes. At 706, the access point can be transmitted to over a disparate carrier. Thus, cross-carrier communications are provided, as described herein, allowing an access point to communicate over an assigned carrier to achieve optimal SNR, while receiving communications over disparate carriers, for example.

Turning to FIG. 8, a methodology 800 is illustrated that facilitates communicating over carriers assigned according to access point power class. At 802, carrier assignment information can be received that specifies carriers for access points of different power classes. This can include one or more carriers dedicated to power classes, for example, and can be generated or received from an access point providing a cell. At 804, a carrier can be selected for transmitting signals based at least in part on the carrier assignment information and a power class. This can be an anchor carrier, as described, or one or more disparate carriers allocated for the power class. At 806, a signal can be transmitted to one or more mobile devices over the carrier. In addition, the selected carrier can be assigned to a disparate power class where the one or more mobile devices are in close proximity. As described, carriers for disparate power classes can be used, in one example, where significant interference will not be caused to access points of the disparate power class. Moreover, the carrier assignment information can specify signal strength information for the carriers according to power class where, for example, multiple power classes can use certain carriers at disparate power levels. In this example, the signal can be transmitted according to the power level.

It will be appreciated that, in accordance with one or more aspects described herein, inferences can be made regarding selecting or determining carriers for different access point power classes, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
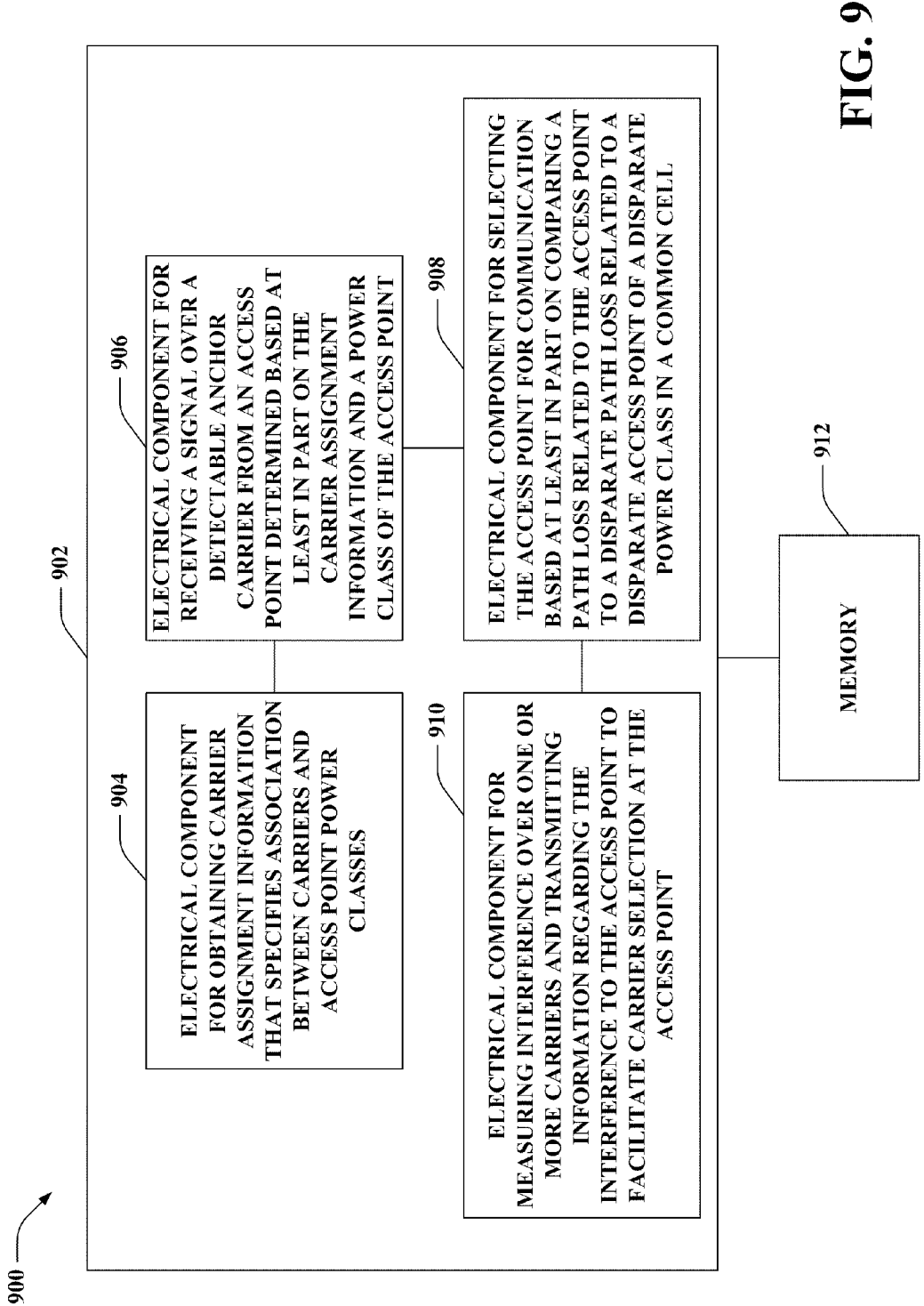
FIG. 9 is a block diagram of an example apparatus that receives signals over carriers assigned to access points by power class.

With reference to FIG. 9, illustrated is a system 900 that receives signals from access points over carriers assigned to power classes of access points. For example, system 900 can reside at least partially within a base station, mobile device, or another device that provides access to a wireless network. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for obtaining carrier assignment information that specifies association between carriers and access point power classes 904. For example, as described, the carrier assignment information can include anchor carriers for the power classes allowing access points of disparate power class to transmit pilot signals without being interfered by other power classes. Further, logical grouping 902 can comprise an electrical component for receiving a signal over a detectable anchor carrier from an access point determined based at least in part on the carrier assignment information and a power class of the access point 906.

Path loss (or SNR) can be determined from the signal, for example, to determine whether to select the access point for communication. In this regard, logical grouping 902 can include an electrical component for selecting the access point for communication based at least in part on comparing a path loss related to the access point to a disparate path loss related to a disparate access point of a disparate power class in a common cell 908. Thus, the access point with the best path loss or SNR can be selected regardless of power class. Moreover, logical grouping 902 can include an electrical component for measuring interference over one or more carriers and transmitting information regarding the interference to the access point to facilitate carrier selection at the access point 910. As described, for example, where the carrier is interfered from a neighboring access point in another cell using disparate carrier assignment information, a different carrier can be selected by the access point to mitigate the interference. Additionally, system 900 can include a memory 912 that retains instructions for executing functions associated with electrical components 904, 906, 908, and 910. While shown as being external to memory 912, it is to be understood that one or more of electrical components 904, 906, 908, and 910 can exist within memory 912.

Figure 10:
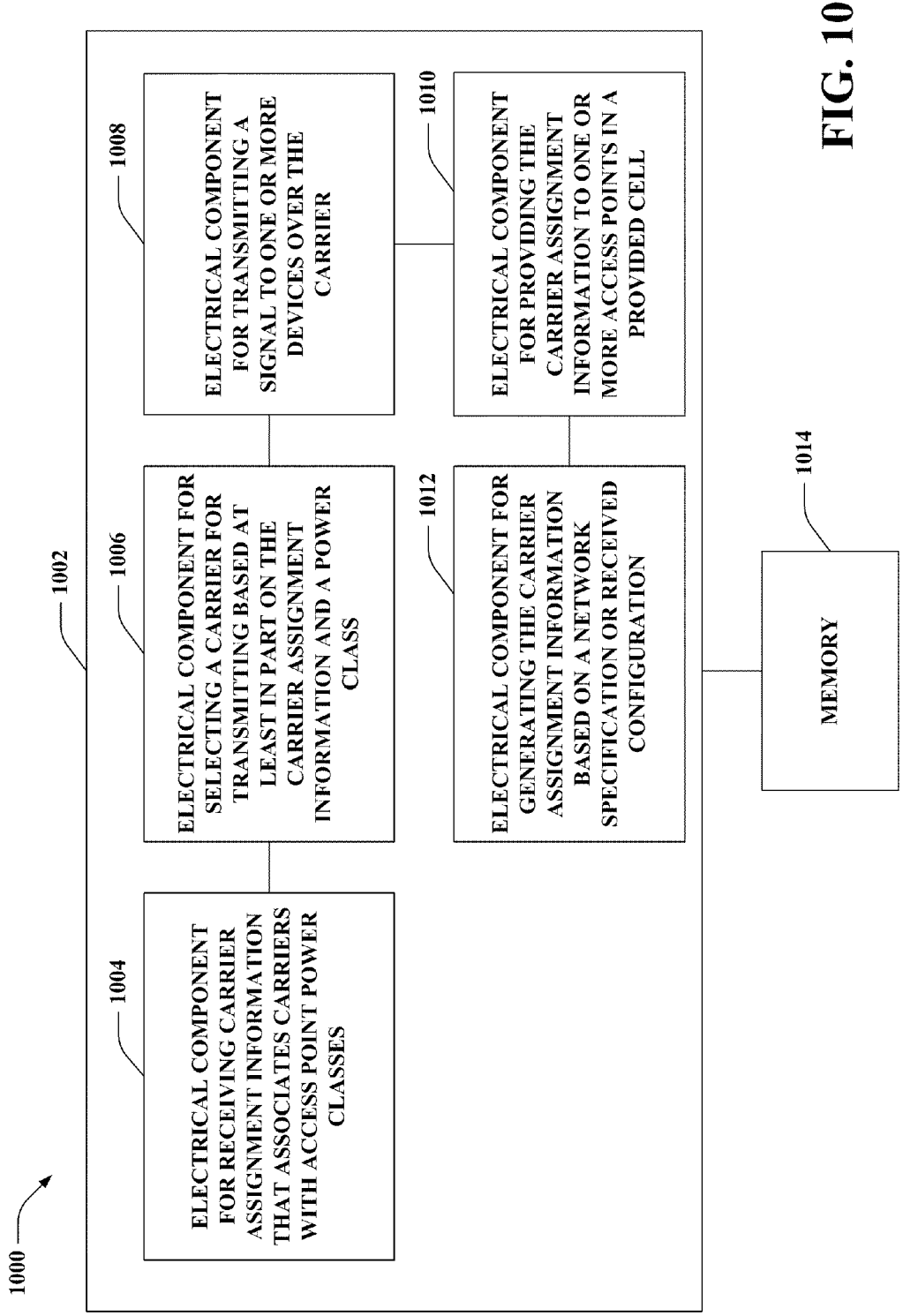
FIG. 10 is a block diagram of an example apparatus that facilitates selecting carriers for transmitting signals according to power class and carrier assignment information.

With reference to FIG. 10, illustrated is a system 1000 that communicates over carriers assigned according to access point power classes. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving carrier assignment information that associates carriers with access point power classes 1004. This information, for example, can be generated and/or received by an access point or other network component. Further, logical grouping 1002 can comprise an electrical component for selecting a carrier for transmitting based at least in part on the carrier assignment information and a power class 1006. As described, in one example, a carrier associated with the power class can be selected. In another example, however, a disparate carrier can be selected, which can relate to a disparate power class, based on proximity to a device receiving a signal over the carrier.

Moreover, logical grouping 1002 includes an electrical component for transmitting a signal to one or more devices over the carrier 1008. Furthermore, logical grouping 1002 can also include an electrical component for providing the carrier assignment information to one or more access points in a provided cell 1010. In addition, logical grouping 1002 includes an electrical component for generating the carrier assignment information based on a network specification or received configuration 1012. As described, carrier assignment information can be defined for a provided cell and provisioned to various access points residing in the cell. Additionally, system 1000 can include a memory 1014 that retains instructions for executing functions associated with electrical components 1004, 1006, 1008, 1010, and 1012. While shown as being external to memory 1014, it is to be understood that one or more of electrical components 1004, 1006, 1008, 1010, and 1012 can exist within memory 1014.

Figure 11:
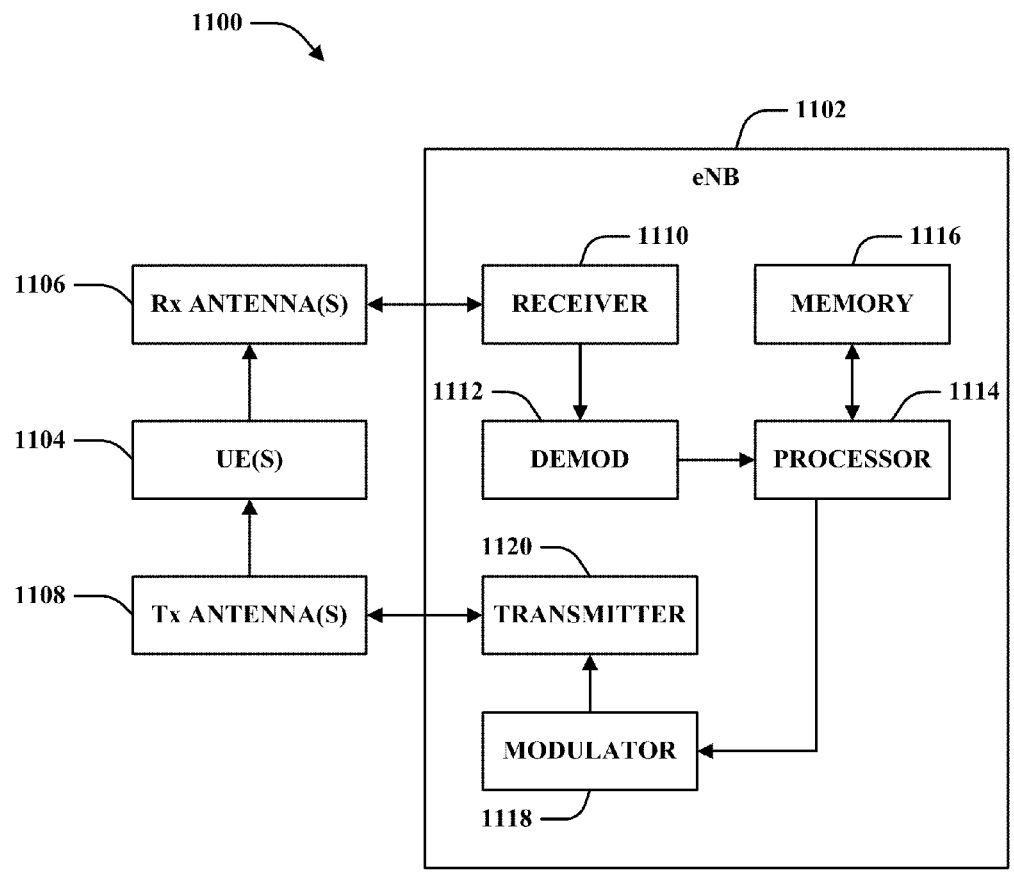
FIGS. 11-12 are block diagrams of example wireless communication devices that can be utilized to implement various aspects of the functionality described herein.

FIG. 11 is a block diagram of a system 1100 that can be utilized to implement various aspects of the functionality described herein. In one example, system 1100 includes a base station or eNB 1102. As illustrated, eNB 1102 can receive signal(s) from one or more UEs 1104 via one or more receive (Rx) antennas 1106 and transmit to the one or more UEs 1104 via one or more transmit (Tx) antennas 1108. Additionally, eNB 1102 can comprise a receiver 1110 that receives information from receive antenna(s) 1106. In one example, the receiver 1110 can be operatively associated with a demodulator (Demod) 1112 that demodulates received information. The demodulated information can then be analyzed by a processor 1114. Processor 1114 can be coupled to memory 1116, which can store information related to code clusters, access terminal assignments, lookup tables related thereto, unique scrambling sequences, and/or other suitable types of information. In one example, eNB 1102 can employ processor 1114 to perform methodologies 700, 800, and/or other similar and appropriate methodologies. eNB 1102 can also include a modulator 1118 that can multiplex a signal for transmission by a transmitter 1120 through transmit antenna(s) 1108.

Figure 12:
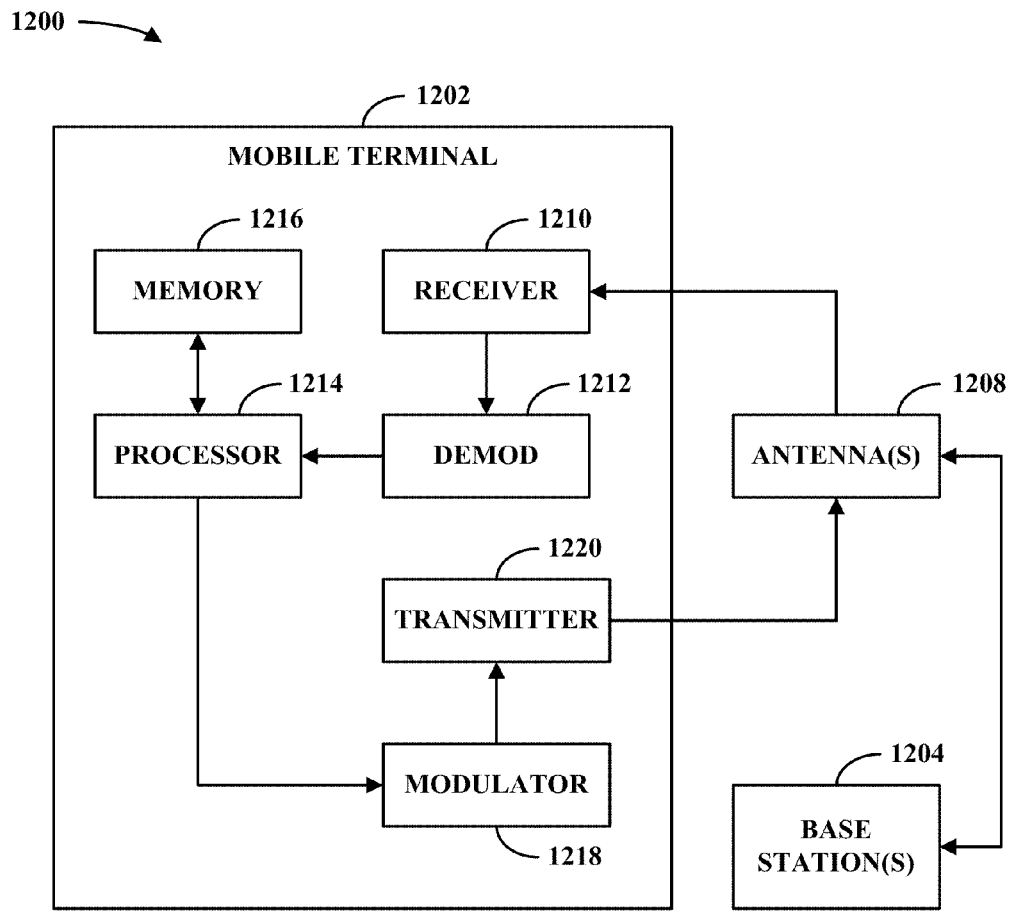

FIG. 12 is a block diagram of another system 1200 that can be utilized to implement various aspects of the functionality described herein. In one example, system 1200 includes a mobile terminal 1202. As illustrated, mobile terminal 1202 can receive signal(s) from one or more base stations 1204 and transmit to the one or more base stations 1204 via one or more antennas 1208. Additionally, mobile terminal 1202 can comprise a receiver 1210 that receives information from antenna(s) 1208. In one example, receiver 1210 can be operatively associated with a demodulator (Demod) 1212 that demodulates received information. The demodulated information can then be analyzed by a processor 1214. Processor 1214 can be coupled to memory 1216, which can store data and/or program codes related to mobile terminal 1202. Additionally, mobile terminal 1202 can employ processor 1214 to perform methodologies 700, 800, and/or other similar and appropriate methodologies. Mobile terminal 1202 can also employ one or more components described in previous figures to effectuate the described functionality. In one example, the components can be implemented by the processor 1214. Mobile terminal 1202 can also include a modulator 1218 that can multiplex a signal for transmission by a transmitter 1220 through antenna(s) 1208.

Figure 13:
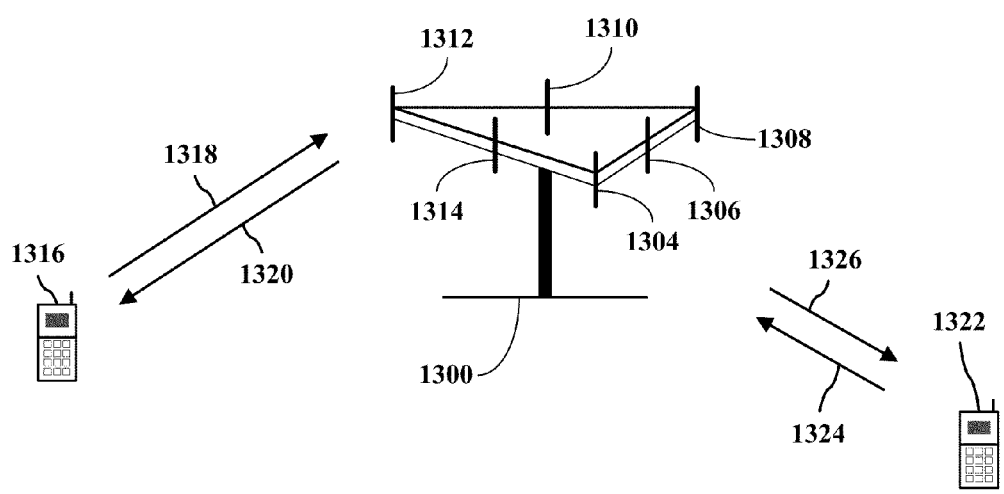
FIG. 13 illustrates an example wireless multiple-access communication system in accordance with various aspects set forth herein.

Referring now to FIG. 13, an illustration of a wireless multiple-access communication system is provided in accordance with various aspects. In one example, an access point 1300 (AP) includes multiple antenna groups. As illustrated in FIG. 13, one antenna group can include antennas 1304 and 1306, another can include antennas 1308 and 1310, and another can include antennas 1312 and 1314. While only two antennas are shown in FIG. 13 for each antenna group, it should be appreciated that more or fewer antennas may be utilized for each antenna group. In another example, an access terminal 1316 can be in communication with antennas 1312 and 1314, where antennas 1312 and 1314 transmit information to access terminal 1316 over forward link 1320 and receive information from access terminal 1316 over reverse link 1318. Additionally and/or alternatively, access terminal 1322 can be in communication with antennas 1306 and 1308, where antennas 1306 and 1308 transmit information to access terminal 1322 over forward link 1326 and receive information from access terminal 1322 over reverse link 1324. In a frequency division duplex system, communication links 1318, 1320, 1324 and 1326 can use different frequencies for communication. For example, forward link 1320 may use a different frequency than that used by reverse link 1318.

Each group of antennas and/or the area in which they are designed to communicate can be referred to as a sector of the access point. In accordance with one aspect, antenna groups can be designed to communicate to access terminals in a sector of areas covered by access point 1300. In communication over forward links 1320 and 1326, the transmitting antennas of access point 1300 can utilize beamforming in order to improve the signal-to-noise ratio of forward links for the different access terminals 1316 and 1322. Also, an access point using beamforming to transmit to access terminals scattered randomly through its coverage causes less interference to access terminals in neighboring cells than an access point transmitting through a single antenna to all its access terminals.

An access point, e.g., access point 1300, can be a fixed station used for communicating with terminals and can also be referred to as a base station, an eNB, an access network, and/or other suitable terminology. In addition, an access terminal, e.g., an access terminal 1316 or 1322, can also be referred to as a mobile terminal, user equipment, a wireless communication device, a terminal, a wireless terminal, and/or other appropriate terminology.

Figure 14:
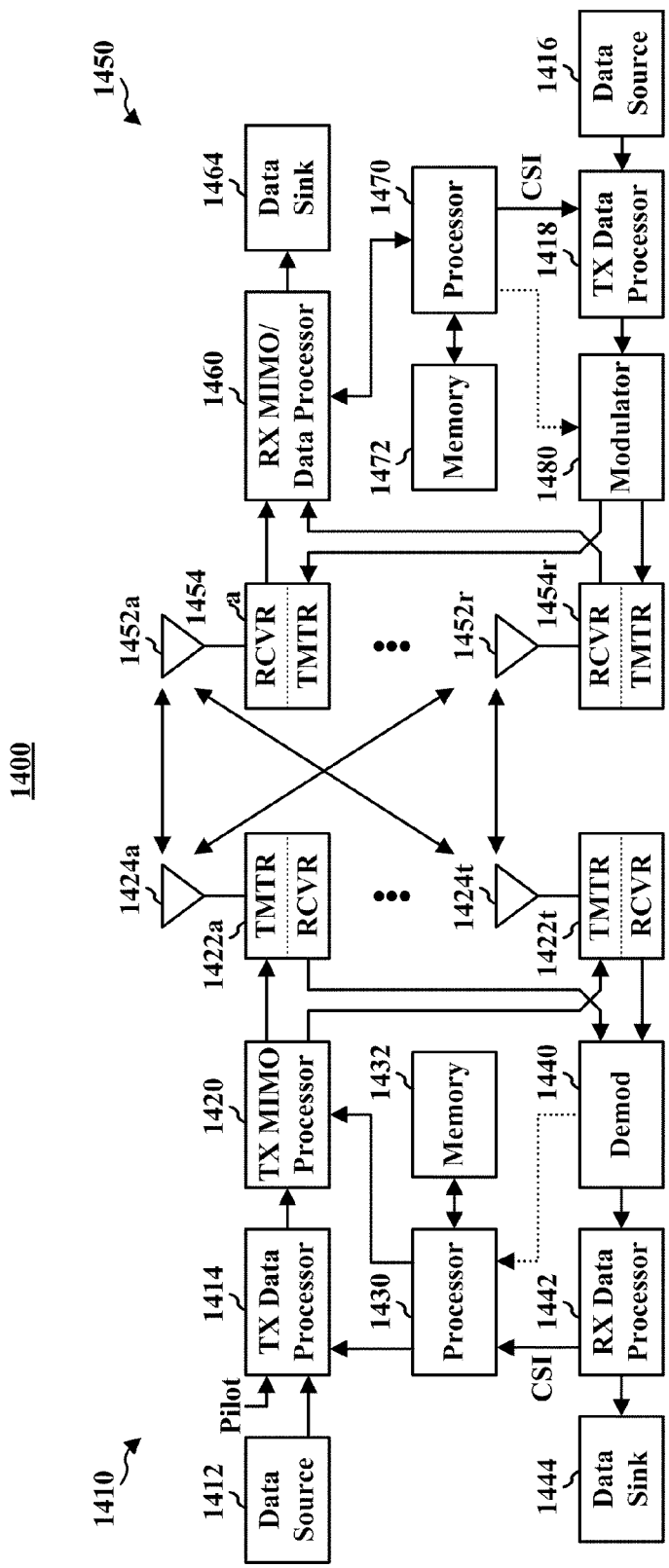
FIG. 14 is a block diagram illustrating an example wireless communication system in which various aspects described herein can function.

Referring now to FIG. 14, a block diagram illustrating an example wireless communication system 1400 in which various aspects described herein can function is provided. In one example, system 1400 is a multiple-input multiple-output (MIMO) system that includes a transmitter system 1410 and a receiver system 1450. It should be appreciated, however, that transmitter system 1410 and/or receiver system 1450 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1410 and/or receiver system 1450 described herein could be utilized in connection with a single output to single input antenna system.

In accordance with one aspect, traffic data for a number of data streams are provided at transmitter system 1410 from a data source 1412 to a transmit (TX) data processor 1414. In one example, each data stream can then be transmitted via a respective transmit antenna 1424. Additionally, TX data processor 1414 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1450 to estimate channel response. Back at transmitter system 1410, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1430.

Next, modulation symbols for all data streams can be provided to a TX processor 1420, which can further process the modulation symbols (e.g., for OFDM). TX MIMO processor 1420 can then provides $N_T$ modulation symbol streams to $N_T$ transceivers 1422a through 1422t. In one example, each transceiver 1422 can receive and process a respective symbol stream to provide one or more analog signals. Each transceiver 1422 can then further condition (e.g., amplify, filter, and upconvert) the analog signals to provide a modulated signal suitable for transmission over a MIMO channel. Accordingly, $N_T$ modulated signals from transceivers 1422a through 1422t can then be transmitted from $N_T$ antennas 1424a through 1424t, respectively.

In accordance with another aspect, the transmitted modulated signals can be received at receiver system 1450 by $N_R$ antennas 1452a through 1452r. The received signal from each antenna 1452 can then be provided to respective transceivers 1454. In one example, each transceiver 1454 can condition (e.g., filter, amplify, and downconvert) a respective received signal, digitize the conditioned signal to provide samples, and then processes the samples to provide a corresponding "received" symbol stream. An RX MIMO/data processor 1460 can then receive and process the $N_R$ received symbol streams from $N_R$ transceivers 1454 based on a particular receiver processing technique to provide $N_T$ "detected" symbol streams. In one example, each detected symbol stream can include symbols that are estimates of the modulation symbols transmitted for the corresponding data stream. RX MIMO/Data processor 1460 can then process each symbol stream at least in part by demodulating, deinterleaving, and decoding each detected symbol stream to recover traffic data for a corresponding data stream. Thus, the processing by RX MIMO/Data processor 1460 can be complementary to that performed by TX MIMO processor 1420 and TX data processor 1418 at transmitter system 1410. RX MIMO/Data processor 1460 can additionally provide processed symbol streams to a data sink 1464.

In accordance with one aspect, the channel response estimate generated by RX MIMO/Data processor 1460 can be used to perform space/time processing at the receiver, adjust power levels, change modulation rates or schemes, and/or other appropriate actions. Additionally, RX MIMO/Data processor 1460 can further estimate channel characteristics such as, for example, signal-to-noise-and-interference ratios (SNRs) of the detected symbol streams. RX MIMO/Data processor 1460 can then provide estimated channel characteristics to a processor 1470. In one example, RX MIMO/Data processor 1460 and/or processor 1470 can further derive an estimate of the "operating" SNR for the system. Processor 1470 can then provide channel state information (CSI), which can comprise information regarding the communication link and/or the received data stream. This information can include, for example, the operating SNR. The CSI can then be processed by a TX data processor 1418, modulated by a modulator 1480, conditioned by transceivers 1454a through 1454r, and transmitted back to transmitter system 1410. In addition, a data source 1416 at receiver system 1450 can provide additional data to be processed by TX data processor 1418.

Back at transmitter system 1410, the modulated signals from receiver system 1450 can then be received by antennas 1424, conditioned by transceivers 1422, demodulated by a demodulator 1440, and processed by a RX data processor 1442 to recover the CSI reported by receiver system 1450. In one example, the reported CSI can then be provided to processor 1430 and used to determine data rates as well as coding and modulation schemes to be used for one or more data streams. The determined coding and modulation schemes can then be provided to transceivers 1422 for quantization and/or use in later transmissions to receiver system 1450. Additionally and/or alternatively, the reported CSI can be used by processor 1430 to generate various controls for TX data processor 1414 and TX MIMO processor 1420. In another example, CSI and/or other information processed by RX data processor 1442 can be provided to a data sink 1444.

In one example, processor 1430 at transmitter system 1410 and processor 1470 at receiver system 1450 direct operation at their respective systems. Additionally, memory 1432 at transmitter system 1410 and memory 1472 at receiver system 1450 can provide storage for program codes and data used by processors 1430 and 1470, respectively. Further, at receiver system 1450, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 15:
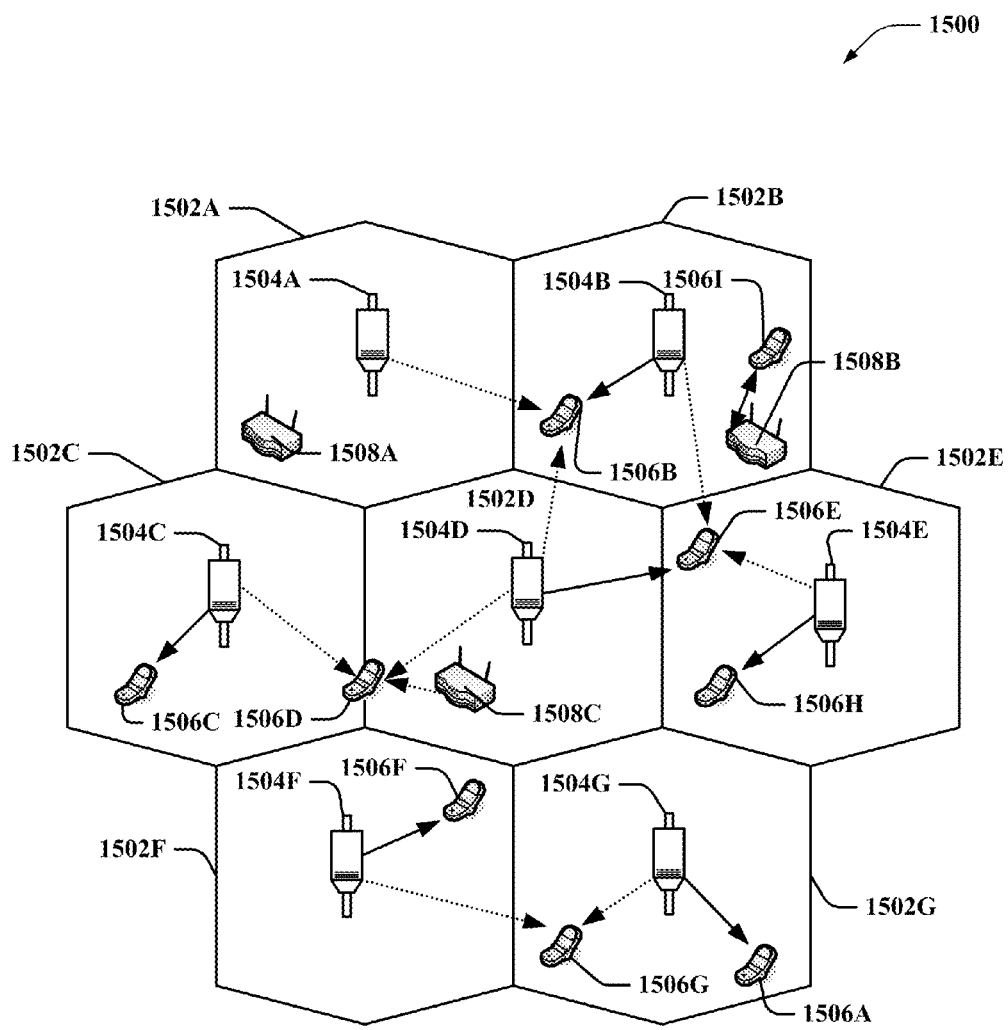
FIG. 15 is an illustration of a wireless communication network that can support and utilize various aspects described herein.

Now referring to FIG. 15, a wireless communication system 1500 configured to support a number of mobile devices is illustrated. The system 1500 provides communication for multiple cells, such as for example, macrocells 1502A-1502G, with each cell being serviced by a corresponding access point 1504A-1504G. As described previously, for instance, the access points 1504A-1504G related to the macrocells 1502A-1502G can be base stations. Mobile devices 1506A-1506I are shown dispersed at various locations throughout the wireless communication system 1500. Each mobile device 1506A-1506I can communicate with one or more access points 1504A-1504G on a forward link and/or a reverse link, as described. In addition, access points 1508A-1508C are shown. These can be smaller scale access points, such as femtocells, picocells, relay nodes, etc. offering services related to a particular service location, as described. The mobile devices 1506A-1506I can additionally communicate with these smaller scale access points 1508A-1508C to receive offered services. The wireless communication system 1500 can provide service over a large geographic region, in one example (e.g., macrocells 1502A-1502G can cover a few blocks in a neighborhood, and the femtocell access points 1508A-1508C can be present in areas such as residences, office buildings, and/or the like as described). In an example, the mobile devices 1506A-1506I can establish connection with the access points 1504A-1504G and/or 1508A-1508C over the air and/or over a backhaul connection.

Additionally, as shown, the mobile devices 1506A-1506I can travel throughout the system 1500 and can handover communications to (or reselect cells related to) the various access points 1504A-1504G and/or 1508A-1508C as it moves through the different macrocells 1502A-1502G or femtocell coverage areas. In one example, one or more of the mobile devices 1506A-1506I can be associated with a home femtocell related to at least one of femtocell access points 1508A-1508C. For example, mobile device 1506I can be associated with femtocell access point 1508B as its home femtocell (e.g. home eNB). Thus, though mobile device 1506I is in macrocell 1502B, and thus in coverage area of access point 1504B, it can communicate with the femtocell access point 1508B instead of (or in addition to) access point 1504B. In one example, the femtocell access point 1508B can provide additional services to the mobile device 1506I, such as desirable billing or charges, minute usage, enhanced services (e.g., faster broadband access, media services, etc.). Some femtocell access points 1508A-1508C can be closed subscriber group access points allowing only certain mobile devices connection (e.g., based on brand, service, bandwidth capabilities, user profile, and/or the like).

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   determining an anchor carrier, from a plurality of available carriers, assigned to an access point having a first access point power class, wherein the anchor carrier is assigned to the access point based at least in part on carrier assignment information, the carrier assignment information defining a first carrier assignment scheme for the access point,
   wherein the carrier assignment information specifies an anchor carrier reserved for an access point power class of a plurality of access point power classes for downlink control data transmissions and maximum power level associated with the anchor carrier based at least in part on the access point power class of the access point,
   wherein the first carrier assignment scheme specifies a first carrier designated as the anchor carrier, a second carrier reserved as an additional carrier, and power levels of the first carrier and the second carrier for downlink control data transmissions for the first access point power class, and
   wherein a disparate access point having a disparate access point power class has a second carrier assignment scheme that is different from the first carrier assignment scheme, wherein the second carrier assignment scheme specifies a third carrier designated as the anchor carrier and a power level of the third carrier for downlink control data transmissions for the disparate access point power class;
   receiving a first control data transmission from the access point using the anchor carrier at a first power level;
   transmitting interference information to the access point, the interference information based on interference received on the anchor carrier, wherein the interference is received from the disparate access point having the disparate access point power class; and
   receiving a second control data transmission from the access point using the second carrier at a second power level, wherein the second carrier and the second power level are selected based at least in part on the transmitted interference information and the second power level does not exceed the maximum power level specified in the carrier assignment information.

2. The method of claim 1, further comprising receiving the interference on the anchor carrier from the disparate access point.

3. The method of claim 1, wherein the receiving the first control data transmission includes receiving the first control data transmission from the access point at a low power level based at least in part on the first access point power class of the access point.

4. The method of claim 1, wherein the access point is a picocell access point or a femtocell access point and the disparate access point is a macrocell access point.

5. The method of claim 1, wherein the disparate access point communicates over one or more disparate carriers based at least in part on the disparate access point power class, and wherein at least one of the one or more disparate carriers is an anchor carrier for the disparate access point.

6. The method of claim 1, further comprising receiving a disparate transmission from the access point over the second carrier.

7. The method of claim 1, further comprising transmitting interference information related to the second carrier to the access point.

8. A wireless communications apparatus, comprising:
   at least one processor configured to:
   determine an anchor carrier, from a plurality of available carriers, assigned to an access point having a first access point power class, wherein the anchor carrier is assigned to the access point based at least in part on carrier assignment information, the carrier assignment information defining a first carrier assignment scheme for the access point,
   wherein the carrier assignment information specifies an anchor carrier reserved for an access point power class of a plurality of access point power classes for downlink control data transmissions and maximum power level associated with the anchor carrier based at least in part on the access point power class of the access point,
   wherein the first carrier assignment scheme specifies a first carrier designated as the anchor carrier, a second carrier reserved as an additional carrier, and power levels of the first carrier and the second carrier for downlink control data transmissions for the first access point power class, and
   wherein a disparate access point having a disparate access point power class has a second carrier assignment scheme that is different from the first carrier assignment scheme, wherein the second carrier assignment scheme specifies a third carrier designated as the anchor carrier and a power level of the third carrier for downlink control data transmissions for the disparate access point power class;
   receive a first control data transmission from the access point using the anchor carrier at a first power level;
   transmit interference information to the access point, the interference information based on interference received on the anchor carrier, wherein the interference is received from the disparate access point having the disparate access point power class; and
   receive a second control data transmission from the access point using the second carrier at a second power level, wherein the second carrier and the second power level are selected based at least in part on the transmitted interference information and the second power level does not exceed the maximum power level specified in the carrier assignment information; and a memory coupled to the at least one processor.

9. The wireless communications apparatus of claim 8, wherein the at least one processor is further configured to receive the interference on the anchor carrier from the disparate access point.

10. The wireless communications apparatus of claim 8, wherein the access point is a picocell access point or a femtocell access point and the disparate access point is a macrocell access point.

11. An apparatus, comprising:
    means for determining an anchor carrier, from a plurality of available carriers, assigned to an access point having a first access point power class, wherein the anchor carrier is assigned to the access point based at least in part on carrier assignment information, the carrier assignment information defining a first carrier assignment scheme for the access point, wherein the carrier assignment information specifies an anchor carrier reserved for an access point power class of a plurality of access point power classes for downlink control data transmissions and maximum power level associated with the anchor carrier based at least in part on the access point power class of the access point, wherein the first carrier assignment scheme specifies a first carrier designated as the anchor carrier, a second carrier reserved as an additional carrier, and power levels of the first carrier and the second carrier for downlink control data transmissions for the first access point power class, and wherein a disparate access point having a disparate access point power class has a second carrier assignment scheme that is different from the first carrier assignment scheme, wherein the second carrier assignment scheme specifies a third carrier designated as the anchor carrier and a power level of the third carrier for downlink control data transmissions for the disparate access point power class;

means for receiving a first control data transmission from the access point using the anchor carrier at a first power level;

means for transmitting interference information to the access point, the interference information based on interference received on the anchor carrier, wherein the interference is received from the disparate access point having the disparate access point power class; and means for receiving a second control data transmission from the access point using the second carrier at a second power level, wherein the second carrier and the second power level are selected based at least in part on the transmitted interference information and the second power level does not exceed the maximum power level specified in the carrier assignment information.

12. The apparatus of claim 11, wherein the means for receiving receives the interference on the anchor carrier from the the disparate access point.

13. The apparatus of claim 11, wherein the access point is a picocell access point or a femtocell access point and the disparate access point is a macrocell access point.

14. A computer program product, comprising:
a non-transitory computer-readable medium comprising:
code for causing at least one computer to determine an anchor carrier, from a plurality of available carriers, assigned to an access point having a first access point power class, wherein the anchor carrier is assigned to the access point based at least in part on carrier assignment information, the carrier assignment information defining a first carrier assignment scheme for the access point, wherein the carrier assignment information specifies an anchor carrier reserved for an access point power class of a plurality of access point power classes for downlink control data transmissions and maximum power level associated with the anchor carrier based at least in part on the access point power class of the access point, wherein the first carrier assignment scheme specifies a first carrier designated as the anchor carrier, a second carrier reserved as an additional carrier, and power levels of the first carrier and the second carrier for downlink control data transmissions for the first access point power class, and wherein a disparate access point having a disparate access point power class has a second carrier assignment scheme that is different from the first carrier assignment scheme, wherein the second carrier assignment scheme specifies a third carrier designated as the anchor carrier and a power level of the third carrier for downlink control data transmissions for the disparate access point power class;

code for causing the at least one computer to receive a first control data transmission from the access point using the anchor carrier at a first power level;

code for causing the at least one computer to transmit interference information to the access point, the interference information based on interference received on the anchor carrier, wherein the interference is received from the disparate access point having the disparate access point power class; and code for causing the at least one computer to receive a second control data transmission from the access point using the second carrier at a second power level, wherein the second carrier and the second power level are selected based at least in part on the transmitted interference information and the second power level does not exceed the maximum power level specified in the carrier assignment information.

15. The computer program product of claim 14, further comprising:
code for causing the at least one computer to receive the interference on the anchor carrier from the disparate access point.

16. The computer program product of claim 14, wherein the access point is a picocell access point or a femtocell access point and the disparate access point is a macrocell access point.

17. An apparatus, comprising:
an access point selecting component that:
determines an anchor carrier, from a plurality of available carriers, assigned to an access point having a first access point power class, wherein the anchor carrier is assigned to the access point based at least in part on carrier assignment information, the carrier assignment information defining a first carrier assignment scheme for the access point, wherein the carrier assignment information specifies an anchor carrier reserved for an access point power class of a plurality of access point power classes for downlink control data transmissions and maximum power level associated with the anchor carrier based at least in part on the access point power class of the access point, wherein the first carrier assignment scheme specifies a first carrier designated as the anchor carrier, a second carrier reserved as an additional carrier, and power levels of the first carrier and the second carrier for downlink control data transmissions for the first access point power class, and wherein a disparate access point having a disparate access point power class has a second carrier assignment scheme that is different from the first carrier assignment scheme, wherein the second carrier assignment scheme specifies a third carrier designated as the anchor carrier and a power level of the third carrier for downlink control data transmissions for the disparate access point power class;

a transmitting component that:
transmits interference information to the access point, the interference information based on interference received on the anchor carrier, wherein the interference is received from the disparate access point having the disparate access point power class; and a receiving component that:

receives a first control data transmission from the access point using the anchor carrier at a first power level;

receives a second control data transmission from the access point using the second carrier at a second power level, wherein the second carrier and the second power level are selected based at least in part on the transmitted interference information and the second power level does not exceed the maximum power level specified in the carrier assignment information.

18. The apparatus of claim 17, wherein the receiving component receives the interference on the anchor carrier from the disparate access point.

19. The apparatus of claim 17, wherein the access point is a picocell access point or a femtocell access point and the disparate access point is a macrocell access point.

20. A method, comprising:

receiving, at an access point having a first access point power class, carrier assignment information that specifies an anchor carrier reserved for an access point power class of a plurality of access point power classes for downlink control data transmissions and maximum power level associated with the anchor carrier based at least in part on the access point power class of the access point, the carrier assignment information defining a first carrier assignment scheme for the access point;

selecting an anchor carrier for transmitting control data transmissions in a wireless network and a power level for the anchor carrier based at least in part on the carrier assignment information and the first access point power class;

wherein the first carrier assignment scheme specifies a first carrier designated as the anchor carrier, a second carrier reserved as an additional carrier, and power levels of the first carrier and the second carrier for downlink control data transmissions for the first access point power class, and wherein a disparate access point having a disparate access point power class has a second carrier assignment scheme that is different from the first carrier assignment scheme, wherein the second carrier assignment scheme specifies the first a third carrier designated as the anchor carrier and a power level of the first third carrier for downlink control data transmissions for the disparate access point power class;

transmitting a first control data transmission using the selected carrier at a first power level;

receiving interference information from one or more mobile devices, the interference information based on interference received by a more mobile devices on the selected carrier, wherein the interference is received from the disparate access point having the disparate access point power class; and transmitting a second control data transmission to the one or more mobile devices using the second carrier at a second power level, wherein the second carrier and the second power level are selected based at least in part on the received interference information and the second power level does not exceed the maximum power level specified in the carrier assignment information.

21. The method of claim 20, wherein the receiving the carrier assignment information includes receiving the carrier assignment information from a macrocell access point.

22. The method of claim 20, further comprising determining a proximity of the one or more mobile devices, wherein the selected carrier is selected based at least in part on the proximity of the one or more mobile devices.

23. The method of claim 20, wherein the carrier assignment information specifies open access shared carriers with unrestricted power for macrocell access point power classes, open access shared carriers with low power for femtocell or picocell access point power classes, and closed access carriers with low power for closed subscriber group access point power classes.

24. The method of claim 20, further comprising transmitting the carrier assignment information to one or more access points in a provided cell.

25. The method of claim 24, further comprising generating the carrier assignment information based on a network specification or received configuration.

26. A wireless communications apparatus, comprising:

at least one processor configured to:

receive, at an access point having a first access point power class, carrier assignment information that specifies an anchor carrier reserved for an access point power class of a plurality of access point power classes for downlink control data transmissions and maximum power level associated with the anchor carrier based at least in part on the access point power class of the access point, the carrier assignment information defining a first carrier assignment scheme for the access point;

select an anchor carrier for transmitting control data transmissions in a wireless network and a power level for the anchor carrier based at least in part on the carrier assignment information and the first access point power class;

wherein the first carrier assignment scheme specifies a first carrier designated as the anchor carrier, a second carrier reserved as an additional carrier, and power levels of the first carrier and the second carrier for downlink control data transmissions for the first access point power class, and wherein a disparate access point having a disparate access point power class has a second carrier assignment scheme that is different from the first carrier assignment scheme, wherein the second carrier assignment scheme specifies a third carrier designated as the anchor carrier and a power level of the third carrier for downlink control data transmissions for the disparate access point power class;

transmit a first control data transmission using the selected carrier at a first power level;

receive interference information from one or more mobile devices, the interference information based on interference received by a more mobile devices on the selected carrier, wherein the interference is received from the disparate access point having the disparate access point power class; and transmit a second control data transmission to the one or more mobile devices using the second carrier at a second power level, wherein the second carrier and the second power level are selected based at least in part on the received interference information and the second power level does not exceed the maximum power level specified in the carrier assignment information; and a memory coupled to the at least one processor.

27. The wireless communications apparatus of claim 26, wherein the at least one processor receives the carrier assignment information from a macrocell access point.

28. The wireless communications apparatus of claim 26, wherein the selected carrier is selected based at least in part on a proximity of the one or more mobile devices.

29. The wireless communications apparatus of claim 26, wherein the wireless communications apparatus is a picocell access point or a femtocell access point.

30. An apparatus, comprising:
means for receiving, at an access point having a first access point power class, carrier assignment information that specifies an anchor carrier reserved for an access point power class of a plurality of access point power classes for downlink control data transmissions and maximum power level associated with the anchor carrier based at least in part on the access point power class of the access point, the carrier assignment information defining a first carrier assignment scheme for the access point;
means for selecting an anchor carrier for transmitting control data transmissions in a wireless network and a power level for the anchor carrier based at least in part on the carrier assignment information and the first access point power class;
wherein the first carrier assignment scheme specifies a first carrier designated as the anchor carrier, a second carrier reserved as an additional carrier, and power levels of the first carrier and the second carrier for downlink control data transmissions for the first access point power class, and
wherein a disparate access point having a disparate access point power class has a second carrier assignment scheme that is different from the first carrier assignment scheme, wherein the second carrier assignment scheme specifies a third carrier designated as the anchor carrier and a power level of the third carrier for downlink control data transmissions for the disparate access point power class;
means for transmitting a first control data transmission using the selected carrier at a first power level;
means for receiving interference information from one or more mobile devices, the interference information based on interference received by a more mobile devices on the selected carrier, wherein the interference is received from the disparate access point having the disparate access point power class; and
means for transmitting a second control data transmission to the one or more mobile devices using the second carrier at a second power level, wherein the second carrier and the second power level are selected based at least in part on the received interference information and the second power level does not exceed the maximum power level specified in the carrier assignment information.

31. The apparatus of claim 30, wherein the means for receiving the carrier assignment information receives the carrier assignment information from a macrocell access point.

32. The apparatus of claim 30, wherein the means for selecting the selected carrier obtains a proximity of the one or more mobile devices and selects the selected carrier based at least in part on the proximity of the one or more mobile devices.

33. A computer program product, comprising:
a non-transitory computer-readable medium comprising:
code for causing at least one computer to receive, at an access point having a first access point power class, carrier assignment information that specifies an anchor carrier reserved for an access point power class of a plurality of access point power classes for downlink control data transmissions and maximum power level associated with the anchor carrier based at least in part on the access point power class of the access point, the carrier assignment information defining a first carrier assignment scheme for the access point;
code for causing the at least one computer to select an anchor carrier for transmitting control data transmissions in a wireless network and a power level for the anchor carrier based at least in part on the carrier assignment information and the first access point power class;
wherein the first carrier assignment scheme specifies a first carrier designated as the anchor carrier, a second carrier reserved as an additional carrier, and power levels of the first carrier and the second carrier for downlink control data transmissions for the first access point power class, and
wherein a disparate access point having a disparate access point power class has a second carrier assignment scheme that is different from the first carrier assignment scheme, wherein the second carrier assignment scheme specifies a third carrier designated as the anchor carrier and a power level of the third carrier for downlink control data transmissions for the disparate access point power class;
code for causing the at least one computer to transmit a first control data transmission using the selected carrier at a first power level;
code for causing the at least one computer to receive interference information from one or more mobile devices, the interference information based on interference received by a more mobile devices on the selected carrier, wherein the interference is received from the disparate access point having the disparate access point power class; and
code for causing the at least one computer to transmit a second control data transmission to the one or more mobile devices using the second carrier at a second power level, wherein the second carrier and the second power level are selected based at least in part on the received interference information and the second power level does not exceed the maximum power level specified in the carrier assignment information.

34. The computer program product of claim 33, wherein the code for causing the at least one computer to receive the carrier assignment information receives the carrier assignment information from a macrocell access point.

35. The computer program product of claim 33, wherein the non-transitory computer-readable medium further comprises code for causing the at least one computer to determine a proximity of the one or more mobile devices and to select the selected carrier based at least in part on the proximity of the one or more mobile devices.

36. An apparatus, comprising:
a carrier configuration component that receives, at an access point having a first access point power class, carrier assignment information that specifies an anchor carrier reserved for an access point power class of a plurality of access point power classes for downlink control data transmissions and maximum power level associated with the anchor carrier based at least in part on the access point power class of the access point, the carrier assignment information defining a first carrier assignment scheme for the access point;
a carrier selecting component that selects an anchor carrier for transmitting control data transmissions in a wireless network and a power level for the anchor carrier based at least in part on the carrier assignment information and the first access point power class;
wherein the first carrier assignment scheme specifies a first carrier designated as the anchor carrier, a second carrier reserved as an additional carrier, and power levels of the first carrier and the second carrier for downlink control data transmissions for the first access point power class, and
wherein a disparate access point having a disparate access point power class has a second carrier assignment scheme that is different from the first carrier assignment scheme, wherein the second carrier assignment scheme specifies a third carrier designated as the anchor carrier and a power level of the third carrier for downlink control data transmissions for the disparate access point power class;

a receiving component that receives interference information from one or more mobile devices, the interference information based on interference received by a more mobile devices on the selected carrier, wherein the interference is received from the disparate access point having the disparate access point power class; and a carrier communication component that:

transmits a first control data transmission using the selected carrier at a first power level; and transmits a second control data transmission to the one or more mobile devices using the second carrier at a second power level, wherein the second carrier and the second power level are selected based at least in part on the received interference information and the second power level does not exceed the maximum power level specified in the carrier assignment information.

37. The apparatus of claim 36, wherein the carrier configuration component receives the carrier assignment information from a macrocell access point.

38. The apparatus of claim 36, wherein the carrier selecting component obtains a proximity of the one or more mobile devices and selects the selected carrier based at least in part on the proximity of the one or more mobile devices.

* * * * *